(12) United States Patent
Furuya et al.

(10) Patent No.: US 6,432,509 B1
(45) Date of Patent: Aug. 13, 2002

(54) COMPOSITE FILM FOR CAPACITOR, METHOD FOR MANUFACTURING THE SAME, AND BASE FILM THEREFOR

(75) Inventors: Koji Furuya; Shinya Watanabe; Hiroshi Kusume, all of Sagamihara; Akira Kameoka, Matsuyama, all of (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/762,480
(22) PCT Filed: May 29, 2000
(86) PCT No.: PCT/JP00/03459
§ 371 (c)(1),
(2), (4) Date: Feb. 7, 2001
(87) PCT Pub. No.: WO00/75939
PCT Pub. Date: Dec. 14, 2000

(30) Foreign Application Priority Data

Jun. 8, 1999 (JP) ............................................. 11-160775
Dec. 28, 1999 (JP) ........................................... 11-372526

(51) Int. Cl.⁷ ......................... B32B 15/04; B32B 15/08; B32B 27/06; B32B 27/36
(52) U.S. Cl. ...................... 428/141; 428/213; 428/215; 428/216; 428/328; 428/330; 428/331; 428/336; 428/457; 428/458; 428/480; 428/694 ST; 428/694 SG; 427/79; 427/80; 427/91; 427/123
(58) Field of Search .................................. 428/141, 212, 428/213, 215, 216, 323, 328, 330, 331, 336, 339, 457, 458, 480, 694 ST, 694 SG; 427/79, 80, 91, 123

(56) References Cited

U.S. PATENT DOCUMENTS

| | | | | |
|---|---|---|---|---|
| 4,990,400 A | * | 2/1991 | Endo et al. | 428/331 |
| 5,106,681 A | * | 4/1992 | Endo et al. | 428/323 |
| 5,288,784 A | * | 2/1994 | Minayoshi | 523/514 |
| 5,595,819 A | * | 1/1997 | Anderson et al. | 428/330 |
| 5,824,394 A | * | 10/1998 | Kinoshita et al. | 264/173.16 |

FOREIGN PATENT DOCUMENTS

| | | | |
|---|---|---|---|
| JP | 49-60367 | 6/1974 | ........... B23B/27/06 |
| JP | 59-41258 | 3/1984 | ........... B23B/27/36 |
| JP | 62-95289 | 5/1987 | ............ B41M/5/26 |
| JP | 62-109216 | 5/1987 | ............ G11B/5/66 |
| JP | 7-57964 | 3/1995 | ............ H01G/4/18 |
| JP | 7-47645 | 5/1995 | .............. C08J/5/18 |
| JP | 10-329210 | * 12/1998 | |

* cited by examiner

Primary Examiner—Vivian Chen
(74) Attorney, Agent, or Firm—Sughrue Mion, PLLC

(57) ABSTRACT

A composite film for a film condenser, which comprises a biaxially oriented film made of polyethylene-2,6-naphthalenedicarboxylate as a main polymer component and an electrically conductive metal thin layer formed on the surface of the biaxially oriented film, wherein the number of flyspecks having an average diameter of 60 $\mu$m or greater in the surface of said biaxially oriented film is 20/m² or less and the number of portions failing to satisfy a dielectric breakdown voltage of 200 V/$\mu$m (electrical insulation defects) in said composite film is 20/m² or less, and a biaxially oriented film therefor.

According to the present invention, there is provided a high-quality composite film for a film condenser, which has excellent physical properties and electric characteristics. Further, there is provided a very thin biaxially oriented film excellent in processability and surface properties and usable for the composite film.

29 Claims, 1 Drawing Sheet

F I G. 1
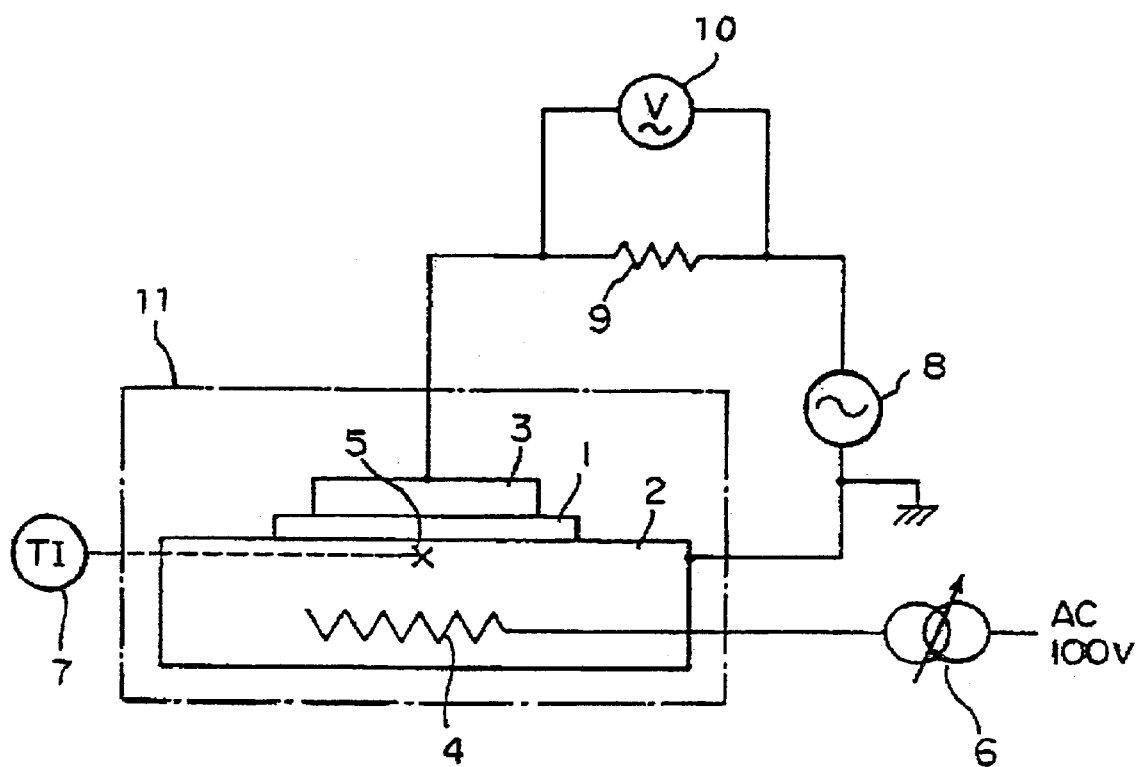

COMPOSITE FILM FOR CAPACITOR, METHOD FOR MANUFACTURING THE SAME, AND BASE FILM THEREFOR

DETAILED DESCRIPTION OF THE INVENTION

1. Filed of the Invention

The present invention relates to a composite film for a condenser, a method for the production thereof and a base film for use therefor. More specifically, it relates to a composite film for a condenser which film comprises, as a base film, a biaxially oriented film containing polyethylene-2,6-naphthalenedicarboxylate as a main polymer component and an electrically conductive metal thin film layer formed thereon, a method for the production of the composite film and a base film for use in the composite film.

2. Prior Art

Having excellent mechanical properties, thermal properties and heat resistance, a biaxially oriented film containing polyethylene-2,6-naphthalenedicarboxylate as a main polymer component is used as a base film (dielectric) for a condenser, and the production thereof is increasing.

Meanwhile, as it is required to decrease electric or electronic circuits in size in recent years, it is also required to decrease the condenser in size and increase the capacitance thereof. It is therefore required to decrease the thickness of a film made of a dielectric as a base. In a film condenser, the thickness of the film as a dielectric is decreased for a reason that the electrostatic capacity of the condenser is (a) in proportion to the dielectric constant and the electrode area of the dielectric and (b) in inverse proportion to the thickness of the film. In other words, the electrostatic capacity of a dielectric per unit volume is in inverse proportion to a square of a film thickness and in proportion to a dielectric constant. If it is attempted to decrease a condenser in size or increase the capacitance thereof while using dielectrics having one dielectric constant, it is inevitable to decrease the film thickness.

It is clear that decreasing the film thickness has the above effect. However, simply decreasing conventional biaxially oriented films in thickness causes new problems. For example, decreasing the film thickness involves poor workability during deposition of electrodes on a film or in the step of slit or winding elements.

The above workability is mainly concerned with the slipperiness of a film. For improving the slipperiness, there is known a method of imparting the film surface with microscopic hills and valleys, and the method is employed. As this method, there is known a method in which inert inorganic fine particles are added to a polyester as a film material during or after polymerization for the polyester (external particle addition method), or part or the whole of a catalyst, etc., used for the polymerization for the polyester is precipitated in a polymer in a reaction step (internal particle precipitation method).

However, when the method for producing a very thin film uses a polymer containing inert inorganic particles having the same concentration as that of inert inorganic particles used for producing a film having an intermediate thickness, the number of the inert inorganic fine particles per unit area of the very thin film decreases, and one fine particle is more widely spaced from another fine particle in the film surface, so that the film surface is flattened and shows a decrease in slipperiness. Further, a very thin film has low stiffness and films adhere easily each other, thereby causing the slipperiness to decrease. For offsetting a decrease in slipperiness caused by a decrease in thickness of the film, therefore, it is required to increase the concentration of the inert inorganic fine particles added to a polymer or increase the size thereof with a decrease in the thickness of the film.

When a polymer containing inert inorganic fine particles is melt-extruded, voids are liable to be formed around the inert inorganic fine particles in the film due to poor affinity between the inert inorganic fine particles and the polymer if a high draft ratio is employed or if the film is further stretched, and the frequency of such formation also increases. Therefore, not only the obtained film is poor in mechanical properties (such as breaking strength or breaking elongation) and electrical properties (such as electrical insulation defect), but also breaking is liable to take place during the production of the film, which causes problems such as a decrease in productivity and an absence of stability of production conditions.

As a film for making it possible to decrease the occurrence of voids, JP-A-1-266145 (JP-B-7-47645) discloses a thin thermoplastic film which is excellent in workability (handling properties) and improved in film formability (non-breaking properties) and has a thickness of 4 μm or less, and which comprises 0.01 to 3% by weight of porous inert inorganic particles having a porosity of 50 to 95% and having an average particle diameter of 0.05 to 5 μm and 0.005 to 1% by weight of spherical silica particles having an average particle diameter of 0.2 to 4 μm which is greater than the thickness of the film in a thermoplastic polymer constituting a film.

Studies made by the present inventors have showed that, when a polyethylene-2,6-naphthalenedicarboxylate film is used as the above film, the film has advantages that it shows no decrease in the mechanical properties, that its heat resistance and electric insulating properties are excellent and that voids do not occur much. However, it has been shown that the film still has a problem that it suffers breaking during the formation thereof and therefore impairs productivity of the film.

A polyethylene-2,6-naphthalenedicarboxylate film generally has a characteristic feature that it has poor tear resistance properties as compared with a polyethylene terephthalate film, and this feature causes the trouble of breaking to take place frequently during the formation of the film. The factor which has not caused any problem during the formation of the polyethylene terephthalate film causes the breaking in the production of the polyethylene-2,6-naphthalenedicarboxylate film in some cases.

JP-A-7-57964 discloses a polyethylene-2,6-naphthalenedicarboxylate film containing two types of porous silica particles having different average particle diameters in a specific mixing ratio. However, this film involves a problem that it has poor productivity since it also breaks frequently during its formation.

It has been also made clear that each of the above polyethylene-2,6-naphthalenedicarboxylate films has a thick air layer due to surface protrusions when stacked one sheet thereof is stacked on another, whereby they are not sufficient in insulating properties and space factor, so that there is still a problem to be solved that excellent workability is not compatible with the space factor and insulating properties.

In the production of a film condenser, further, for avoiding poor productivity caused by decreasing the thickness of a film as a dielectric and poor workability (deposition of a metal for electrodes on a film, slitting and winding of an element) in the step of processing a thin film to a condenser, JP-A-10-294237 proposes that two different types of inert fine particles as a lubricant be added to a polyethylene-2,6-naphthalate film.

The above film is improved in workability in the steps of forming a thin film and processing the film into a condenser. Since, however, an insulating failure is caused due to additives (the lubricants in particular) contained in the film, the above film is not yet satisfactory as a film for a condenser.

Problems to Be Solved by the Invention

It is a first object of the present invention to provide a very thin biaxially oriented film made of polyethylene-2,6-naphthalenedicarboxylate which is for use as a dielectric in a high-quality film condenser having excellent physical and electrical properties.

It is a second object of the present invention to provide a biaxially oriented film having advanced surface properties so that it is suitable for exhibiting processability for a film condenser and electric properties of a film condenser even if it is a very thin biaxially oriented film.

It is a third object of the present invention to provide a biaxially oriented film which has excellent workability in the steps of producing a film condenser (metal deposition, winding of an element, cutting and metallized contact) and has sufficient heat resistance and mechanical strength in these steps.

It is another object of the present invention to provide a composite film for a film condenser excellent in electric properties, dielectric breakdown voltage in particular, and a composite film for a film condenser whose electrical insulation defects are as small as possible.

It is still another object of the present invention to provide a small-sized high-capacitance film condenser.

Means to Solve the Problems

According to studies made by the present inventors, the above objects of the present invention are achieved by the following inventions (I) to (IV).

(I) A composite film for a film condenser comprising a biaxially oriented film made of polyethylene-2,6-naphthalenedicarboxylate as a main polymer component and an electrically conductive metal thin layer formed on the surface of the biaxially oriented film, wherein the number of flyspecks having an average diameter of 60 $\mu$m or more in the surface of said biaxially oriented film is 20/m$^2$ or less and the number of portions failing to satisfy a dielectric breakdown voltage of 200 V/$\mu$m (electrical insulation defects) in said composite film is 20/m$^2$ or less.

(II) A method for producing a film condenser member, which comprises depositing an electrically conductive metal on the surface of a biaxially oriented film made of polyethylene-2,6-naphthalenedicarboxylate as a main polymer component to obtain a composite film having an electrically conductive metal thin film layer on the surface thereof and laminating a plurality of the composite films, wherein, as said biaxially oriented film, a film satisfying the following requirements (1) to (3) is used, (1) the film has a central line average surface roughness (Ra), in the surface thereof, of 40 to 80 nm, (2) the number of flyspecks having an average diameter of 60 $\mu$m or more in the surface thereof is 20/m$^2$ or less, and (3) after the film is heat-treated at 200° C. for 10 minutes, the film has a thermal shrinkage factor in the longitudinal direction (MD) and a thermal shrinkage factor in the transverse direction (TD) in a thermal shrinkage factor ratio (MD/TD) of 0.39 to 0.82.

(III) A film condenser composed of a laminated composite material formed of a plurality of composite films each of which comprises a biaxially oriented film made of polyethylene-2,6-naphthalenedicarboxylate as a main polymer component and an electrically conductive metal thin layer formed on the surface of the biaxially oriented film, wherein the number of flyspecks having an average diameter of 60 $\mu$m or more in the surface of said biaxially oriented film is 20/m$^2$ or less and the percentage of a failure to satisfy a dielectric breakdown voltage of 200 V/$\mu$m (electrical insulation defects) in the film condenser is 10% or less.

(IV) A polyester film for a condenser, which is a biaxially oriented film made of polyethylene-2,6-naphthalenedicarboxylate as a main polymer component, the film satisfying the following requirements (1) to (3), (1) the film has a central line average surface roughness (Ra), in the surface thereof, of 40 to 80 nm, (2) the number of flyspecks having an average diameter of 60 $\mu$m or more in the surface thereof is 20/m$^2$ or less, and (3) after the film is heat-treated at 200° C. for 10 minutes, the film has a thermal shrinkage factor in the longitudinal direction (MD) and a thermal shrinkage factor in the transverse direction (TD) in a thermal shrinkage factor ratio (MD/TD) of 0.39 to 0.82.

The present invention will be explained further in detail hereinafter.

First, the very thin biaxially oriented film as a dielectric, used in the composite film for a film condenser and the production method thereof provided by the present invention, will be explained.

The above biaxially oriented film will be sometimes abbreviated as "base film" in the present invention. The base film is made of polyethylene-2,6-naphthalenedicarboxylate as a main polymer component.

The polyethylene-2,6-naphthalenedicarboxylate is a polyester made from 2,6-naphthalenedicarboxylic acid as a main dicarboxylic acid component and ethylene glycol as a main glycol component. The above term "main" means that at least 90 mol %, preferably at least 95 mol % of all of recurring units constituting the polyester is ethylene-2,6-naphthalenedicarboxylate units.

The polyethylene-2,6-naphthalenedicarboxylate in the present invention may be a copolyester. The copolyester is preferably a copolyester which does not impair the inherent properties of a polyethylene-2,6-naphthalenedicarboxylate (hompolymer) film and which secures insulating properties, mechanical properties and thermal dimensional stability. Further, it is preferably a copolyester formable into a film excellent in anti-breaking properties and slitting properties.

When a copolyester is employed, a comonoer other than the 2,6-naphthalenedicarboxylic acid and ethylene glycol components can be selected from compounds having a molecule containing two ester-forming functional groups. Examples of such compounds include dicarboxylic acids such as oxalic acid, adipic acid, phthalic acid, sebacic acid, dodecanedicarboxylic acid, isophthalic acid, terephthalic acid, 1,4-cyclohexanedicarboxylic acid, 4,4'-diphenyldicarboxylic acid, phenylindanedicarboxylic acid, 2,7-naphthalenedicarboxylic acid, 1,5-naphthalenedicarboxylic acid, tetralindicarboxylic acid, decalindicarboxylic acid and diphenyl ether dicarboxylic acid; hydroxycarboxylic acids such as p-hydroxybenzoic acid and p-hydroxyethoxybenzoic acid; and dihydric alcohols such as propylene glycol, trimethylene glycol, tetramethylene glycol, hexamethylene glycol, cyclohexanedimethylene glycol, neopentyl glycol, an ethylene oxide adduct of bisphenol sulfone, an ethylene oxide adduct of bisphenol A, diethylene glycol and polyethylene oxide glycol.

The above comonomers may be used alone or may be used in combination of at least two at the same time. Of these, isophthalic acid, terephthalic acid, 4,4'-diphenyldicarboxylic acid, 2,7-naphthalenedicarboxylic acid and p-hydroxybenzoic acid are more preferred as an acid component, and trimethylene glycol, hexamethylene glycol, neopentyl glycol and an ethylene oxide adduct of bisphenol sulfone are more preferred as a glycol component.

In the polyethylene-2,6-naphthalenedicarboxylate, further, part or all of terminal hydroxyl group and/or carboxyl group may be blocked with a monofunctional compound such as benzoic acid or methoxypolyalkylene glycol. Further, the polyethylene-2,6-naphthalenedicarboxylate may be a copolyester obtained by copolymerization using a trifunctional or higher ester-forming compound such as glycerin or pentaerythritol in such a very small amount that a substantially linear polymer can be obtained.

The polyethylene-2,6-naphthalenedicarboxylate in the present invention may be a composition containing a small amount of other organic polymer.

The above "other organic polymer" includes, for example, polyethylene terephthalate, polyethylene isophthalate, polytrimethylene terephthalate, polyethylene-4,4'-tetramethylenediphenyldicarboxylate, polyethylene-2,7-naphthalenedicarboxylate, polytrimethylene-2,6-naphthalenedicarboxylate, polyneopenylene-2,6-naphthalenedicarboxylate and poly(bis(4-ethyleneoxyphenyl)sulfone)-2,6-naphthalenedicarboxylate. Of these, polyethylene isophthalate, polytrimethylene terephthalate, polytrimethylene-2,6-naphthalenedicarboxylate and poly(bis(4-ethyleneoxyphenyl)sulfone)-2,6-naphthalenedicarboxylate are preferred.

The above organic polymers may be contained alone or in combination at least two.

When the organic polymer is incorporated, the amount thereof based on the composition is 10% by weight or less, preferably 5% by weight or less. The above composition may be a composition containing a homopolymer of polyethylene-2,6-naphthalenedicarboxylate and other organic polymer, or it may be a composition containing a copolymer of polyethylene-2,6-naphthalenedicarboxylate and other organic polymer.

Studies made by the present inventors have showed that when polyethylene-2,6-naphthalenedicarboxylate is melted and extruded to form a film, a value of the alternate current volume resistivity of the film has an influence on breaking and productivity of the film in the step of forming the film and also has an influence on the insulating properties of a condenser.

That is, it has been found that a film having an alternate current volume resistivity (Z) of from $5 \times 10^7$ Ωcm or higher to $1 \times 10^9$ Ωcm or less at a temperature of 300° C. is preferred. When the value of the alternate current volume resistivity is less than $5 \times 10^7$ Ωcm, the insulating properties of the condenser in a relatively high temperature range of 70° C. or higher decrease, the dielectric tangent thereof increases, and the condenser characteristics are degraded. When it exceeds $5 \times 10^9$ Ωcm, the film is frequently broken at the step of forming the film under some film-forming conditions, and the range of conditions of maintaining the stable production of the film is limited.

While the method for obtaining a film having an alternate current volume resistivity in the above range is not specially limited, it is preferred to employ a method of copolymerizing a sulfonic acid quaternary phosphonium salt having an ester-forming functional group into the main chain of the polymer. The content thereof in the polymer chain is preferably at least 0.1 mmol % or more but not more than 10 mmol % based on the total recurring units. Further, the sulfonic acid quaternary phosphonium salt having an ester-forming functional group is preferably a compound represented by the following formula.

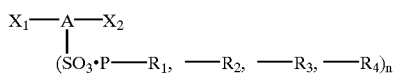

wherein A is an aliphatic group having 2 to 18 carbon atoms or an aromatic group, each having a valence of (n+2), each of $X_1$ and $X_2$ is identical or not and a hydrogen atom or an ester-forming functional group, n is 1 or 2, and each of $R_1$, $R_2$, $R_3$ and $R_4$ is identical or not and an alkyl group having 1 to 18 carbon atoms, benzyl or an aryl group having 6 to 12 carbon atoms, provided that $X_1$ and $X_2$ can be simultaneously hydrogen atoms in no case.

Specific examples of the above sulfonic acid quaternary phosphonium salt preferably include 3,5-dicarboxybenzenesulfonic acid tetrabutylphosphonium salt, 3,5-dicarboxybenzenesulfonic acid ethyltributylphosphonium salt, 3,5-dicarboxybenzenesulfonic acid benzyltributylphosphonium salt, 3,5-dicarboxybenzenesulfonic acid phenyltributylphosphonium salt, 3,5-dicarboxybenzenesulfonic acid tetraphenylphosphonium salt, 3,5-dicarboxybenzenesulfonic acid ethyltriphenylphosphonium salt, 3,5-dicarboxybenzenesulfonic acid butyltriphenylphosphonium salt, 3,5-dicarboxybenzenesulfonic acid benzyltriphenylphosphonium salt, 3,5-dicarbomethoxybenzenesulfonic acid tetrabutylphosphonium salt, 3,5-dicarbomethoxybenzenesulfonic acid ethyltributylphosphonium salt, 3,5-dicarbomethoxybenzenesulfonic acid benzyltributylphosphonium salt, 3,5-dicarbomethoxybenzenesulfonic acid phenyltributylphosphonium salt, 3,5-dicarbomethoxybenzenesulfonic acid tetraphenylphosphonium salt, 3,5-dicarbomethoxybenzenesulfonic acid ethyltriphenylphosphonium salt, 3,5-dicarbomethoxybenzenesulfonic acid butyltriphenylphosphonium salt, 3,5-dicarbomethoxybenzenesulfonic acid benzyltriphenylphosphonium salt, 3-carboxybenzenesulfonic acid tetrabutylphosphonium salt, 3-carboxybenzenesulfonic acid tetraphenylphosphonium slat, 3-carbomethoxybenzenesulfonic acid tetrabutylphosphonium salt, 3-carbomethoxybenzenesulfonic acid tetraphenylphosphonium salt, 3,5-di(β-hydroxyethoxycarbonyl)benzenesulfonic acid tetrabutylphosphonium salt, 3,5-di(β-hydroxyethoxycarbonyl)benzenesulfonic acid -tetraphenylphosphonium salt, 3-(β-hydroxyethoxycarbonyl)benzenesulfonic acid tetrabutylphosphonium salt, 3-(β-hydroxyethoxycarbonyl) benzenesulfonic acid tetraphenylphosphonium salt, 4-hydroxyethoxybenzenesulfonic acid tetrabutylphosphonium salt, bisphenol A-3,3'-di(sulfonic acid tetrabutylphosphonium salt), 2,6-dicarboxynaphthalene-4-sulfonic acid tetrabutylphosphonium salt and α-tetrabutylphosphoniumsulfosuccinic acid. The above sulfonic acid quaternary phosphonium salts may be used alone or two or more in combination.

Generally, the above sulfonic acid quaternary phosphonium salt can be easily prepared by a reaction between a corresponding sulfonic acid and phosphine known per se or a reaction between a corresponding sulfonic acid metal salt and a quaternary phosphonium halide known per se.

In the biaxially oriented film in the present invention, the content of the above sulfonic acid quaternary phosphonium salt in the polyester based on the total recurring units constituting the polyester is at least 0.1 mmol % but not more than 10 mmol %, preferably at least 0.2 mmol % but not more than 10 mmol %. When the above content is less than 0.1 mmol %, it is not possible to attain an alternate current volume resistivity of 109 Ωcm or less at 300° C. When it exceeds 10 mmol %, the insulating properties may decrease, or the dielectric constant thereof may increase, in a high temperature range (70° C. or higher).

In the present invention, the sulfonic acid quaternary phosphonium salt can be incorporated into the film by any method. For example, there may be employed a method in which the above quaternary phosphonium salt compound is added and copolymerized during the polymerization of the polyester (PEN), a method in which the above quaternary phosphonium salt compound is added to the polyester before the formation of the film, or a method in which a polymer composition (master chip) containing a high concentration of the above quaternary phosphonium salt compound is prepared and a predetermined amount thereof is mixed with the polyester as a main raw material before the polyester is melted. In any method, the effect of the sulfonic acid quaternary phosphonium salt is exhibited so long as the polyester (PEN) is allowed to contain a predetermined amount of the sulfonic acid quaternary phosphonium salt.

The method for producing the polyethylene-2,6-naphthalenedicarboxylate can be carried out according to a method of producing a polyester generally known per se. For example, the polyethylene-2,6-naphthalenedicarboxylate can be produced by reacting 2,6-naphthalenedicarboxylic acid with ethylene glycol (esterification), or reacting a lower alkyl ester of 2,6-naphthalenedicarboxylic acid with ethylene glycol in the presence of an ester interchange catalyst (ester interchange reaction), and then polymerizing a reaction product in the presence of a polymerization catalyst up to a desired molecular weight. As the above ester interchange catalyst, a known ester interchange catalyst such as a compound containing sodium, potassium, magnesium, calcium, zinc, strontium, titanium, zirconium, manganese or cobalt can be used, and these compounds may be used alone or two or more in combination. The polymerization catalyst can be preferably selected from antimony compounds such as antimony trioxide and antimony pentoxide; germanium compounds typified by germanium dioxide; and titanium compounds such as tetraethyl titanate, tetrapropyl titanate, tetraphenyl titanate or partial hydrolyzation products of these, titanylammonium oxalate, titanylpotassium oxalate and titaniumtrisacetylacetonate. The amount of each of the catalysts can be selected from conventionally known amount range.

When the polymerization is carried out via the ester interchange reaction, preferably, a phosphorus compound such as trimethylphosphate, triethylphosphate, tri-n-butylphosphoate or orthophosphoric acid is added for deactivating the ester interchange catalyst before the polymerization. The content of a phosphorus element in the polyethylene-2,6-naphthalenedicarboxylate is preferably 20 to 100 ppm in view of thermal stability of the polyester.

Polyethylene-2,6-naphthalenedicarboxylate obtained by melt polymerization may be formed into chips and the chips may be solid-phase-polymerized under heat and reduced pressure or in an inert gas flow.

The intrinsic viscosity (o-chlorophenol, 25° C.) of the polyester is preferably at least 0.40 dl/g, more preferably at least 0.40 dl/g but not more than 0.90 dl/g, particularly preferably at least 0.43 dl/g but not more than 0.80 dl/g. The above intrinsic viscosity is the most preferably at least 0.45 dl/g but not more than 0.70 dl/g. When the above intrinsic viscosity is less than 0.40 dl/g, the film may break frequently during the step of forming the film. When it is higher than 0.90 dl/g, undesirably, the melt viscosity of the polyester is high so that it is difficult to melt-extrude it, which results in a long time period of polymerization and a decrease in productivity.

The base film of the present invention is obtained by forming the above polyethylene-2,6-naphthalenedicarboxylate as a main polyester component into a film. The conditions and means of the above film formation will be discussed in detail later. Further, inert particles are incorporated into the polyester for forming the film, and preferred properties of the inert particles will be also discussed in detail later. The surface properties and physical properties of the base film for a condenser in the present invention will be explained below.

In the surface of the base film of the present invention, the central line average roughness (Ra) thereof is 40 to 80 nm, more preferably 45 to 80 nm, particularly preferably 50 to 77 nm. When the central line average roughness (Ra) of the base film surface is less than 40 nm, the film is poor in slipperiness and air escape, and it is difficult to take up the film in a roll. For attaining a central line average roughness (Ra) of over 80 nm, it is required to add particles having a large particle diameter or increase the amount of the particles. However, the film has a small thickness, and the frequency of breaking during the formation of the film therefore increases, so that the productivity extremely decreases.

Further, advantageously, the base film surface has a 10-point average roughness (Rz) of 1,000 to 1,800 nm, more preferably 1,100 to 1,700 nm, particularly preferably 1,200 to 1,700 nm.

When the 10-point average roughness (Rz) is lower than 1,000 nm, the film is poor in slipperiness and air escape, and it is difficult to take up uniformly the film in a roll. For attaining a 10-point average roughness (Rz) of over 1,800 nm, it is required to add particles having a large particle diameter or increase the amount of the particles. However, the film has a small thickness, and the frequency of breaking during the formation of the film therefore increases, so that the productivity extremely decreases.

The base film of the present invention is required to achieve that the number of flyspecks having a certain size in the surface thereof is small.

That is, in the film surface, the number of flyspecks having an average diameter of over 60 µm is 20/m² or less, more preferably 15/m² or less, particularly preferably 10/m² or less. The term "flyspeck" refers to a portion which is generated from an additive (lubricant, etc.) or a foreign matter contained in a polymer as a core and which is formed of a small-thickness portion (void) of the core and a polymer forming a film around the core. When the flyspeck is large in size, a region having a small film thickness is broad, so that the film being formed breaks and the insulating performance decreasing due to a concentrated stress when in the step of processing the film into a condenser a tension sharply changes or the film is rapidly heated during the formation of the film or slitting of the film to a proper width. Even if the film does not break, the insulating performance of the film tends to decrease since the film thickness is small. Further, a flyspeck having an average diameter (average of major and minor diameters) of over 60 μm extremely decreases the insulating performance, and when the frequency of presences thereof exceeds 20/m$^2$, the insulating performance as a dielectric for a condenser is insufficient.

For bringing the number of flyspecks having a large size into the above range, it is essential to decrease the number of coarse particles in the polymer to make it as small as possible. For this purpose, preferably, as a filter for use during the formation of the film, there is used a non-woven fabric filter which is made of stainless steel fine wires having a wire diameter of 15 μm or less and which has an average opening of 10 to 30 μm, preferably 15 to 25 μm, and the polymer is filtered. When the above opening of the filter exceeds 30 μm, there is produced no effect on decreasing the coarse particles in a molten polymer. When the opening is less than 10 μm, the filter is liable to be clogged, and practical use thereof is industrially difficult. While other filter having a net-shaped structure or other filter made of a sintered metal, etc., may be available, these filters have problems that they have a short lifetime or are poor in filtering efficiency as compared with the non-woven fabric filter. For more effectively controlling the number of flyspecks having a large size to bring it into the above range, preferably, a lubricant itself is filtered through a filter having a predetermined opening and then added to the polymer.

As is accordingly expected, it is desirable that the number of coarse particles in the base film of the present invention should be small. Specifically, the number of coarse particles having a maximum diameter of over 35 μm per m$^2$ of a film area is desirably 10 or less, preferably advantageously 8 or less, particularly desirably 5 or less.

The above number of coarse particles having a maximum diameter of over 35 μm can be counted on the basis of observation of the film surface through a universal projector as will be described later.

After heat-treated at 200° C. for 10 minutes, the base film of the present invention has a thermal shrinkage factor in the longitudinal direction (MD) and a thermal shrinkage factor in the transverse direction (TD) in a constant thermal shrinkage factor ratio (MD/TD).

That is, the thermal shrinkage factor ratio (MD/TD) of the thermal shrinkage factor in the longitudinal direction (MD) and the thermal shrinkage factor in the transverse direction (TD) is 0.39 to 0.82, preferably 0.41 to 0.80, particularly preferably 0.42 to 0.78. When the thermal shrinkage factor ratio in the longitudinal direction and the transverse direction after heat treatment at 200° C. for 10 minutes is outside the above range, undesirably, there is caused a problem that heat deterioration takes place during deposition in the step of processing the film into a condenser or that the film after deposition is liable to have wrinkles. In view of processing suitability, after the heat treatment at 200° C. for 10 minutes, the heat shrinkage factor in the longitudinal direction (MD) is 0.9 to 3%, preferably 1.0 to 2.8%, and the counterpart in the transverse direction (TD) is 2.0 to 5.0%, preferably 2.2 to 4.8%.

The thickness of the base film of the present invention is preferably 0.5 to 7.0 μm, more preferably 0.6 to 6.0 μm, particularly preferably 0.7 to 5.5 μm. When the thickness of the film is less than 0.5 μm, the film is frequently breaks during the formation of the film and the film formation is difficult since the film thickness is too small. When the thickness of the film exceeds 7.0 μm, the electric properties of the film for a condenser are unsatisfactory.

The thickness of the base film is preferably as uniform as possible. The thickness variability of the film is tolerable so long as it is not more than 25% based on the thickness of the film. The thickness variability based on the film thickness is preferably 20% or less, particularly preferably 15% or less. If the thickness variability of the film based on the film thickness exceeds 25%, undesirably, the thickness variability causes a variability in the performance of a condenser when a laminate of many sheets of such a film is used as a base film for a dielectric of a condenser.

The thickness of the film and the thickness variability of the film are determined on the basis of a method and a definition to be described later.

The base film of the present invention preferably has a density of 1.338 to 1.361 g/cm$^3$. The above density is more preferably 1.340 to 1.358 g/cm$^3$, particularly preferably 1.343 to 1.356 g/cm$^3$. When the above density is less than 1.338 g/cm$^3$, undesirably, a variability is caused on the performance of a condenser, and the processing yield is caused to decrease. When it exceeds 1.361 g/cm$^3$, the crystallizability of the film is too high, and the tenacity of the film disappears, so that the frequency of breaking during the transportation of the film comes to increase.

The method for producing the base film of the present invention will be explained below.

The base film of the present invention is a biaxially oriented film made of polyethylene-2,6-naphthalenedicarboxylate as a main polymer component. This biaxially oriented film can be produced by a usual method, for example, in which the above polymer is melted at a temperature equivalent to, or higher than, the melting point thereof, the melt is extruded onto a cooled casting drum through a die slit, an extruded film is intimately contacted to, cooled on and solidified on the casting drum, to obtain an unstretched film made of polyethylene-2,6-naphthalenedicarboxylate as a main polymer component, the unstretched film is biaxially oriented in the longitudinal and transverse directions, and the stretched film is thermoset and then, optionally, relaxed in the longitudinal direction and/or the transverse direction. The film can be stretched with a known roll-applied longitudinal direction stretching machine, an infrared-heater applied longitudinal direction stretching machine, tenter clip-applied transverse-direction stretching machine, multi-stage stretching machine for carrying out these stretching procedures at a plurality of steps, tubular stretching machine, oven-applied longitudinal direction stretching machine, simultaneous biaxial tenter stretching machine or the like, although the stretching of the film is not specially limited.

The method for producing the base film of the present invention will be explained further in detail below, although it shall not be necessarily limited thereto. The unstretched film obtained in the above manner is stretched 3.0 to 4.5 times, more preferably 3.3 to 4.0 times in the longitudinal direction at 120 to 180° C., more preferably 125 to 170° C., particularly preferably 130 to 160° C. with a roll-applied longitudinal direction stretching machine. While an infrared heater-applied longitudinal direction stretching machine may be used, a roll-applied longitudinal direction stretching machine is preferred when a thin film in particular is stretched since it is advantageous for uniformly heating the entirety of the film. For stretching the film in the longitudinal direction without overstretching, it is preferred to carry out the multi-stage stretching at a plurality of separate steps. After the stretching in the longitudinal direction, in a stenter, the film is further stretched 3.0 to 4.5 times, more preferably 3.5 to 4.3 times in the transverse direction at 120 to 180° C., more preferably 125 to 170° C., particularly preferably 130 to 160° C., and the stretched film is heat-treated at 195 to 250° C., more preferably 205 to 245° C. for 0.3 to 50 seconds and then thermally relaxed at a relation ratio in the range of from 0.5 to 15% in the longitudinal direction and/or the transverse direction, whereby the desired base film can be obtained. For the stretching in the transverse direction, multi-stage stretching at a plurality of steps may be employed.

Inert particles are incorporated into the polymer so that the base film of the present invention has the above surface properties and exhibits the above physical properties. The inert particles added therefor are preferably a combination of two types of particles having different forms. Further, an amount of the inert particles also has an influence on the surface properties.

According to studies made by the present inventors, it has been found that the form, kind and amount of the inert particles to be added to the polymer are advantageously selected from particle incorporation modes (P-1) to (P-4) to be explained below.

(1) Particle Incorporation Mode (P-1)

This mode (P-1) is to incorporate a composition prepared by combining 0.03 to 1.5% by weight of spherical silica particles (A) having an average particle diameter of 0.5 to 3.0 $\mu$m and 0.05 to 2% by weight of spherical silica particles (B) having an average particle diameter of 0.01 to 1.5 $\mu$m. For stably producing the film, further, the average particle diameter of the spherical silica particles is required to be smaller than the intended film thickness, and the above average particle diameter is preferably 90% or less of the film thickness, particularly preferably 80% or less of the film thickness. The average particle diameter of the spherical silica particles (A) is more preferably 0.7 to 2.5 $\mu$m, particularly preferably 0.9 to 2.0 $\mu$m, and the amount of the spherical silica particles (A) is more preferably 0.06 to 1.2% by weight, particularly preferably 0.1 to 0.8% by weight.

Further, the average particle diameter of the spherical silica particles (B) is more preferably 0.05 to 1.2 $\mu$m, particularly preferably 0.1 to 1.0 $\mu$m. The amount of the spherical silica particles (B) is more preferably 0.08 to 1.5% by weight, particularly preferably 0.1 to 1.0% by weight.

As the spherical silica particles (A), spherical silica particles having a larger average particle diameter than the spherical silica particles (B) are used, and preferably, the average particle diameter of the spherical silica particles (A) is larger by 0.1 $\mu$m or more.

The above spherical silica particles are preferably spherical silica particles having an aspect ratio (major diameter/minor diameter) of 1.0 to 1.2, and in view of film formability, handling properties and insulating properties, truly spherical silica particles are particularly preferred.

(2) Particle Incorporation Mode (P-2)

This mode (P-2) is the following porous silica particles (A) or a combination of the particles (A) with the following spherical silica (B).

The porous silica particles (A) are preferably formed of aggregates of primary particles having an average particle diameter of 0.001 to 0.1 $\mu$m. While the porous silica particles (A) exhibit high affinity to polyethylene-2,6-naphthalenedicarboxylate, they often contain coarse particles since they are formed of aggregates. When the coarse particles are contained in the film, the performance of the polyester film for a condenser is caused to decrease. When the average particle diameter of the primary particles is less than 0.001 $\mu$m, undesirably, the particles come to easily aggregate since they have a large surface area, so that coarse aggregates are formed. When the average particle diameter of the primary particles exceeds 0.1 $\mu$m, undesirably, the particles come to lose their porosity, their affinity with polyethylene-2,6-naphthalenedicarboxylate is lost, a void is liable to occur around a lubricant, and the insulating properties are degraded. In view of the slipperiness and air escape of the film, the average particle diameter of the porous silica particles (A) is preferably 0.5 to 5 $\mu$m, more preferably 0.7 to 4.0 $\mu$m, particularly preferably 1.0 to 3.0 $\mu$m. The amount of the porous silica particles (A) is preferably 0.05 to 2% by weight, more preferably 0.07 to 1.8% by weight, particularly preferably 0.1 to 1.5% by weight.

The pore volume of the porous silica particle (A) is preferably 0.5 to 2.0 ml/g, more preferably 0.6 to 1.8 ml/g. When the above pore volume is less than 0.5 ml/g, undesirably, the porous silica particle (A) is poor in porosity and the affinity with polyethylene-2,6-naphthalenedicarboxylate no longer exists. When the pore volume exceeds 2.0 ml/g, undesirably, aggregation is liable to take place, and it is difficult to adjust the particle diameter.

In the above mode (P-2), the above porous silica particles (A) are used. In the extrusion step or recovery step in the production of the film, the porous silica particles (A) are milled to decrease their particle diameters, which involves the deterioration of slipperiness. For preventing the deterioration of slipperiness, spherical silica particles (B) may be added in combination.

The spherical silica particles (B) to be added preferably have an average particle diameter of 0.05 to 1.5 $\mu$m, and for producing the film stably, the average particle diameter is required to be smaller than the film thickness. The average particle diameter is preferably 90% or less of the film thickness, and particularly preferably 80% or less of the film thickness. In view of slipperiness and take-up properties of the film and handling properties in the step of producing a condenser, the amount of the spherical silica particles (B) is preferably 0.01 to 1% by weight, more preferably 0.03 to 0.9% by weight. Further, the aspect ratio (major diameter/minor diameter) of the spherical silica particles (B) is preferably 1.0 to 1.2.

In this mode (P-2), particularly preferred is a combination of the porous silica particles (A) and the spherical silica particles (B).

(3) Particle Incorporation Mode (P-3)

This mode (P-3) is the following calcium carbonate particles (A) or a combination of the calcium carbonate particles (A) with the following plate-like aluminum silicate particles (B).

In view of slipperiness and air escape of the film, the average particle diameter of the calcium carbonate particles (A) is preferably 0.2 to 5 $\mu$m, more preferably 0.3 to 4 $\mu$m, particularly preferably 0.5 to 3 $\mu$m. Further, the amount of the calcium carbonate particles (A) is preferably 0.03 to 2% by weight, more preferably 0.05 to 1.5% by weight, particularly preferably 0.1 to 1% by weight.

Although not specially limited, the calcium carbonate particles (A) used in the present invention include naturally occurring calcite crystals such as such as limestone, chalk (whiting) and precipitated calcium carbonate formed from lime stone by a chemical method, aragonite obtained by reacting milk of lime with carbon dioxide gas at high temperature, vaterite crystal and any combination of these.

Heavy calcium carbonate (calcite crystal) obtained by mechanically milling limestone may be also used.

While the above mode (P-3) uses the above calcium carbonate particles (A), plate-like aluminum silicate particles (B) may be used in combination.

The average particle diameter of the above aluminum silicate particles (B) is preferably 0.1 to 2 μm, more preferably 0.3 to 1.7 μm, particularly preferably 0.5 to 1.5 μm. In view of slipperiness of the film and handling properties in the step of producing a condenser, the amount thereof is preferably 0.03 to 1% by weight, more preferably 0.06 to 0.8% by weight, particularly preferably 0.1 to 0.7% by weight.

The plate-like aluminum silicate particles (B) refer to aluminosilicate, and are not specially limited. Examples thereof include kaolin clay formed from naturally occurring kaolin mineral, and the like. Further, the kaolin clay may be a product obtained by purification such as washing.

In the above mode (P-3), a combination of the calcium carbonate particles (A) with the aluminum silicate particles (B) is particularly preferred.

(4) Particle Incorporation Mode (P-4)

This mode (P-4) is a combination of two types of porous silica particles (A) and (B). Each type of the porous silica particles (A) and (B) are particles composed of aggregates of primary particles having an average particle diameter of 0.01 to 0.1 μm.

The porous silica particles shows high affinity to polyethylene-2,6-naphthalenedicarboxylate (PEN), and often contain coarse particles since they are formed of aggregates. When the coarse particles are contained in the film, the coarse particle cause the performance of the polyester film for a condenser to decrease. When the average particle diameter of the primary particles is less than 0.01 μm, undesirably, the particles come to easily aggregate since they have a large surface area, so that coarse aggregates are formed. When the average particle diameter of the primary particles exceeds 0.1 μm, undesirably, the particles come to lose their porosity, their affinity with PEN is lost, a void is liable to occur around a lubricant, and the insulating properties are degraded.

In view of slipperiness and air escape of the film, the average particle diameter of the porous silica particles (A) in the mode (P-4) is at least 0.1 μm but not more than 1.5 μm, particularly preferably at least 0.3 μm but not more than 0.9 μm. The porous silica particles (A) work to finely roughen a ground between relatively large protrusions formed of porous silica particles (B). When the average particle diameter of the particles (A) is less than 0.1 μm, the effect of roughening the ground is small, and it is difficult to secure the slipperiness. When it exceeds 1.5 μm, undesirably, a space factor is too large, and a volume is liable to be deficient.

The average particle diameter of the porous silica particles (B) is at least 0.7 μm but not more than 5.0 μm, particularly preferably at least 1.1 μm but not more than 3.0 μm. When the above average particle diameter is less than 0.7 μm, the air escape is insufficient, and the take-up form of the film is poor. When it exceeds 5.0 μm. undesirably, coarse particles increase in number, many insulation defects occur, and a space factor is too large. As the porous silica particles (B), porous silica particles having a larger average particle diameter than the porous silica particles (A) are used, and it is preferred to use the porous silica particles (B) having an average particle diameter larger than that of the porous silica particles (A) by 0.1 μm or more.

The amount of each type of the porous silica particles (A) and (B) is at least 0.01% by weight but not more than 2.0% by weight, and the total amount of the porous silica particles (A) and (B) is at least 0.1% by weight but not more than 2.0% by weight, particularly preferably at least 0.5% by weight but not more than 1.5% by weight. When the above amount is less than the lower limit of the above range, no lubricating effect is exhibited and the workability is too poor to use the film. When the above amount exceeds the upper limit of the above range, undesirably, a space factor is too large.

Each type of the porous silica particles (A) and (B) have a pore volume of at least 0.5 ml/g but not more than 2.0 ml/g, and the above pore volume is preferably at least 0.6 ml/g but not more than 1.8 ml/g. When the pore volume is less than 0.5 ml/g, undesirably, the porosity thereof is poor, and the affinity with PEN no longer exists. When the pore volume exceeds 2.0 ml/g, undesirably, aggregation is liable to take place, so that it is difficult to adjust their particle diameters.

The above term "average particle diameter" means an "equivalent sphere diameter" of a particle existing at a 50% by weight of all the particles measured. The "equivalent sphere diameter" means a diameter of an imaginary sphere (ideal sphere) having the same volume as that of a particle and can be calculated on the basis of an electron microscopic photograph of particles or measurement by a general precipitation method.

When the above porous silica particles (A) and (B) are added, it is preferred to adjust them such that the number of coarse particles having a major diameter of over 35 μm in the film is $10/m^2$ or less, more preferably $8/m^2$ or less, particularly preferably $5/m^2$ or less. When the above number exceeds $10/m^2$, undesirably, breaking of the film frequently occurs during the formation of the film, which causes the productivity to decrease, and many insulation defects of a condenser are caused.

For bringing the number of the coarse particles into the above range, the polymer is filtered during the formation of the film to remove the coarse particles. As a filter therefor, it is preferred to use a non-woven fabric filter which is made of stainless steel fine wires having a wire diameter of 15 μm or less and which has an opening average of 10 to 35 μm.

The base film of the present invention obtained by the above method is formed into a composite film for a condenser by laminating an electrically conductive metal thin layer on one surface or both the surfaces thereof. For laminating the electrically conductive metal thin layer on the base film surface, a deposition method and a sputtering method are preferred, and a deposition method is particularly preferred.

The thickness of the metal thin layer is 0.01 to 0.1 μm, preferably 0.03 to 0.08 μm. The metal is selected from aluminum, zinc or tin, and aluminum is particularly preferred.

The composite film for a film condenser, provided by the present invention, constitutes a high-quality condenser member whose insulation defects are very small in number since the base film thereof is excellent in surface properties and physical properties.

That is, the composite film of the present invention constitutes a film in which the number of portions failing to satisfy a dielectric breakdown voltage of 200 V/μm (electrical insulation defects) is $20/m^2$ or less, preferably $15/m^2$ or less.

Further, the composite film of the present invention has an excellent CR value that shows characteristics as a film condenser member. This CR value is expressed by a product of an insulation resistance value and an electrostatic capacity as will be discussed later. The composite film of the present invention has a CR value of 800 ΩF or more, preferably 1,000 ΩF or more. When the above CR value is less than 800 ΩF, the insulation resistance of the composite film is insufficient, and the composite film is unsuitable as a film condenser member.

The composite film of the present invention is used as a film condenser member. For example, the composite film may be used in the form of a wound sheet of the film or a laminate of sheets of the film. Further, it can be used as chip condenser. In any case, the composite film of the present invention has excellent insulating properties and has a very small thickness, so that it is used as a small-sized film condenser member.

BRIEF DESCRIPTION OF DRAWINGS

FIG. 1 is an outlined diagram of an apparatus for measuring an AC volume resistivity.

Reference Numerals in the drawing have the following meanings.
1: Measurement sample
2: Lower electrode
3: Upper electrode
4: Heater
5: Temperature detector
6: Power source
7: Non-recording thermometer
8: Power source
9: Standard resistor
10: Electron meter
11: Humidifier box The present invention will be explained further in detail with reference to Examples hereinafter. However, the present invention shall not be limited to the following Examples alone. Methods for measuring various physical values and properties and definitions thereof in the present invention are as follows.

(1) Calculation of Amounts of Components (Molar Ratio of Main Component, Molar Ratio of Comonomer Component) of polyethylene-2,6-naphthalenedicarboxylate A film sample is dissolved in measurement solvents (CDCl$_3$:CF$_3$COOD=1:1) and then subjected to $^1$H-NMR measurement, and integral ratios of obtained signals are used for the calculation.

(2) Density

Measured at 25° C. by a sink-float method using a density gradient tube with a calcium nitrate aqueous solution.

(3) Intrinsic Viscosity

Measured using o-chlorophenol as a solvent at 25° C. and thus-obtained values (unit: dl/g) are used.

(4) Surface Roughness (4-1) Central Line Surface Roughness (Ra)

Central line surface roughness (Ra) refers to a value defined in JIS B 0601.

A film surface is measured for a protrusion profile with a non-contact three-dimensional roughness meter (ET-30HK, supplied by Kosaka Kenkyujo) under conditions employing a semiconductor laser having a wavelength of 780 nm, a light probe having a beam diameter of 1.6 μm, a measurement length (Lx) of 1 mm, a sampling pitch of 2 μm, a cut-off of 0.25 mm, a magnification ratio of 10,000 in the thickness direction, a magnification ratio of 200 in the lateral direction and a scanning line number of 100 (hence, measurement length in Y direction=0.2 mm). When the roughness curved surface thereof is expressed as Z=F(x,y), a value (Ra, unit: nm) obtained by the following equation is defined to be a surface roughness of a film.

$$Ra = 1/(LxLy) \int_0^{L_x} \int_0^{L_y} |f(x,y)| dx dy$$

(4-2) 10-Point Average Roughness (Rz)

Five points are taken from hills having high peaks (HP) and five points are taken from valleys having low peaks (Hv), and an average roughness of these is taken as Rz.

$$Rz = \frac{(Hp1 + Hp2 + Hp3 + Hp4 + Hp5) - (Hv1 + Hv2 + Hv3 + Hv4 + Hv5)}{5}$$

(5) Numbers and Sizes of Flyspecks and Coarse Particles (5-1) Flyspecks

A film surface was observed through a universal projector at a magnification of 50 times with a polarized light transmission illumination for flyspecks present in a 1 m$^2$ measurement area, and the flyspecks were marked. Further, each flyspeck was observed through an optical microscope, an average diameter ((maximum diameter+minimum diameter)/2) of each flyspeck including a core and a void occurring around the core was determined, and flyspecks having an average diameter of over 60 μm were counted.

(5-2) Coarse Particles

A 1 m$^2$ wide measurement area of a film surface was observed through a universal projector at a magnification of 50 times with a polarized light transmission illumination, and particles having a maximum diameter of over 35 μm were counted out of particles present in the film.

(6) Film Thickness and Variability of Thickness

Fifty samples having a length of 10 cm and a width of 10 cm each are taken from arbitrary places of a formed film while the sides of one sample are at least 10 cm apart from another in the length and width directions. The thickness T (μm) of each sample is calculated on the basis of the following equation using a width (cm), a length (cm), weight (g) and a density (g/cm$^3$), and an average thickness Tav of the 50 samples is determined and used as a film thickness.

Further, a difference between a maximum thickness Tmax and a minimum thickness Tmin of the above 50 samples is determined, a ratio of the difference to the average thickness Tav is calculated on the basis of the following equation and used as a variability.

Thickness $T$(μm)=(weight/(width×length×density))×10,000

Average thickness $Tav$(μm)=($T1+T2+ \ldots +T50$)/50

Variability of thickness (%)=((maximum thickness $T$max−minimum thickness $T$min)/average thickness $Tav$)×100

(7) Heat Shrinkage Gactors and Ratio Thereof

A film is held in an oven whose temperature is set at 200° C. under a no-tension state for 10 minutes, dimensional changes from dimensions before the heat treatment to dimensions after the heat treatment in the longitudinal direction (MD) and the transverse direction (TD) are calculated as heat shrinkage factors on the basis of the following equation, and on the basis of these values, a ratio of the heat shrinkage factors is determined.

Heat shrinkage factor (%)=((L0−L)/L0)×100

L0: distance between marked points before heat treatment
L: distance between marked points after heat treatment Ratio of heat shrinkage factors (MD/TD)=(heat shrinkage factor in the longitudinal direction/heat shrinkage factor in the transverse direction)

(8) Average Particle Diameter of Primary Particles and Particle Diameter Ratio of Inert Fine Particles (8-1) Average Particle Diameter of Primary Particles Particles of a powder as a sample were dispersed, and a metal deposition film having a thickness of 200 to 300 angstroms was formed on the surface thereof by sputtering with a metal sputtering apparatus. The surface was observed through a scanning electron microscope at a magnification of 10,000 to 30,000 times, and a surface image was processed with Luzex 500 supplied by Nippon Regulators K.K. to determine area-equivalent particle diameters (Di) of 100 particles. A number average value of an area-equivalent diameter (Di) represented by the following equation is defined to be an average particle diameter (D).

$$D = \left(\sum_{i=1}^{n} Di\right) / n$$

(8-2) Particle Diameter Ratio of Inert Fine Particles

A major diameter (Dl) and a minor diameter (Ds) were determined from major diameters (Dli) and minor diameters (Dsi) of 100 particles as a sample in the same manner as in the measurement of the above particle diameter, and a particle diameter ratio was calculated on the basis of a ratio (Dl/Ds) of the major diameter (Dl) and the minor diameter (Ds).

$$Dl = \left(\sum_{i=1}^{n} Dli\right) / n$$

$$Ds = \left(\sum_{i=1}^{n} Dsi\right) / n$$

(9) Average Particle Diameter of Fine Particles (9-1) Average Particle Diameter of Powder Measured with a centrifugal particle size analyzer CP50 supplied by Shimadzu Corporation. There was prepared an accumulated curve of particles having particle diameters and amounts thereof calculated on the basis of an obtained centrifugal precipitation curve, and a particle diameter corresponding to 50 mass percent was read and used as an average particle diameter (see "Particle Size Measurement Technique", issued by Nikkan Kogyo Shinbunsha, 1975, pages 242–247).

(9-2) Particle Diameter of Fine Particles in Film and Particle Diameter Ratio

A sample film piece is fixed to a sample bed for a scanning electron microscope, and the film surface is ion-etched with a sputtering apparatus (JIS-1100 type ion sputtering apparatus) supplied by Nippon Denshi K.K. under a vacuum of 0.13 Pa under conditions of 0.25 kV and 1.25 mA for 10 minutes. Further, gold is sputtered with the same apparatus, and the film surface was observed through a scanning electron microscope at a magnification of 10,000 to 30,000 times to determine major diameters (Dli), minor diameters (Dsi) and area-equivalent particle diameters (Di) of at least 100 particles with Luzex 500 supplied by Nippon Regulator KK. A number average value of area-equivalent particle diameters (Di) expressed by the following equation is taken as an average particle diameter (D).

$$D = \left(\sum_{i=1}^{n} Di\right) / n$$

The particle diameter ratio is calculated as Dl/Ds in which Dl is an average value of the above major diameters and Ds is an average value of the above minor diameters.

(10) Pore Volume

Measured by a nitrogen adsorption desorption method, and a BET method is used for calculation.

(11) Dielectric Breakdown Voltage (BDV)

Measured according to the method shown in JIS C 2318, and a minimum value where n=100 is taken as a dielectric breakdown voltage (BDV).

In the present invention, the dielectric breakdown voltage is preferably at least 220 V/$\mu$m, particularly preferably at least 240 V/$\mu$m.

(12) Film Formability

While a biaxially oriented film was continuously formed for 24 hours, the state of forming the film was observed, and the state was evaluated on the basis of the following ratings.

⊚: The number of breaking times is 0 times/24 hours. Even if the voltage of a pinning wire is decreased to a half, the number of breaking times does not increase, and a film can be formed remarkably stably under broad film-forming conditions.

○: The number of breaking times is 0 times/24 hours. If the voltage of a pinning wire is decreased to a half, the number of breaking times is increased to 1 to three times/24 hours. However, a film can be formed remarkably stably.

Δ: The number of breaking times is 1 to 3 times/24 hours, and a film can be stably formed.

×: The number of breaking times is 4 or more/24 hours, and the film formation is unstable.

(13) Take-up Form of Film Roll

At stages of forming and slitting a film and at a stage after deposition in the processing of the film to form a condenser, a film having a width of 550 mm and a length of 10,000 m was taken-up into a roll, and the take-up form in such a state was visually observed to evaluate it on the basis of the following ratings.

⊚: An excellent take-up form free of a wrinkle and a weaving on a surface both during the forming and slitting of a film and after the deposition.

○: A good take-up form which shows a wrinkle or a weaving to some extent on a surface during the forming and slitting of a film or after the deposition, which is nevertheless not a practical problem.

×: A insufficient take-up form which shows a wrinkle or a weaving on a surface during the forming and slitting of a film or after the deposition to such an extent that a practical problem is caused.

(14) AC Volume Resistivity

Measured with an apparatus shown in FIG. 1. A measurement sample is prepared by laminating sheets of a film so as to have a thickness of approximately 150 $\mu$m. An upper electrode 3 having a diameter of 5.6 cm and a thickness of 0.2 cm, which can maintain a parallel gap of 150 $\mu$m, is disposed on the upper surface of a cylindrical lower electrode 2 having a diameter of 20 cm, and the measurement sample 1 is inserted into the gap so as to come into intimate contact with the electrodes.

The lower electrode 2 has a heater 4 and a temperature detector end 5 inside, and there is employed a constitution in which a variability of surface temperatures on the lower electrode 2 in a measurement surface is 1° C. or less and a temperature difference from the temperature of the detector end portion at a temperature elevation rate of 8° C./minute is 2° C. or less. The detection temperature is measured with a non-recording thermometer 7. The whole of the electrodes are arranged in a temperature-maintaining box 11.

A voltage from a power source 8 is applied between the two electrodes through a standard resistor 9, and the power source generates 100 V, 50 Hz. In a current flowing in this circuit, a voltage generated between the both ends of the standard resistor 9 is read with an electron meter 10 having an internal impedance of 100 MΩ or more.

A film during its melting is measured for an AC volume resistivity at a temperature elevation rate of 8° C./minute on the lower electrode at a measurement temperature of 300° C. with the above apparatus, and the AC volume resistivity Z is determined on the basis of the following equation in which an applied voltage is E, a current is I, an electrode area is S and an inter-electrode distance is d.

$$Z=(E/I)\times(S/d)$$

(15) CR Value

According to the method shown in JIS C 2318, there were prepared two samples by stacking a film sample obtained by slitting a film to a 12 mm width and an aluminum foil having a thickness of 7 μm and a width of 14 mm one on the other while maintaining 2.5 mm as a margin on one side. The two samples are arranged with one margin positioned on one end and the other margin positioned on the other end, so as to prepare a take-up sample having an effective area of 10,000 mm². The sample is pressed under a pressure of 2 MPa at a temperature of 120° C. for 5 minutes. The sample is maintained at 100° C. with a thermokeeper (THK-21-1) supplied by K.K. Kato, both ends of the sample are connected to an LCR meter (AG-4301) supplied by Ando Denki K.K., and measured for an insulation resistance value (Ω) at an applied voltage of 100 V. Then, the sample was measured for an electrostatic capacity (nF) at 1 kHz. The CR value is calculated on the basis of the following equation using an obtained insulation resistance value and electrostatic capacity.

CR value=insulation resistance value×electrostatic capacity

(16) Evaluation of Insulation Defect of Composite Film for Film Condenser

A composite film having a metal thin layer for a film condenser is tested according to the method shown in JIS C 2151. A test voltage is set at 200 V every 1 μm of the thickness of a base film of the composite film. One hundred test pieces are tested, and defects in a test area of 1 m² are counted. A test piece having 20 defects or less is taken as acceptable.

(17) Insulation Defect Ratio of Film Condenser

Two composite films were prepared by attaching a metal thin layer to one surface of a film having a width of 12 mm and a length of 1,000 mm so as to retain a 2.5 mm margin in the width direction on one side. These films were taken up in a stacked state where the width and length directions of one composite film and those of the other composite film are the same, the metal thin layers thereof are not in contact with each other and the margins thereof are positioned on different sides. Then, the composite films are pressed under a pressure of 2 MPa at 120° C. for 5 minutes to prepare one measurement sample. The sample is measured for a breakdown voltage (V) according to the method shown in JIS C2318. A value (V/μm) obtained by dividing the breakdown voltage (V) by the thickness of the base film composing the sample was taken as a dielectric breakdown voltage. When the occurrence ratio of samples whose dielectric breakdown voltage fails to satisfy 200 V/μm on the total number of samples measured is 10% or less, the composite film is taken as acceptable.

EXAMPLES

Example 1

100 Parts of dimethyl 2,6-naphthalenedicarboxylate and 60 parts of ethylene glycol were reacted in ester interchange in the presence of 0.03 part of manganese acetate tetrahydrate as an ester interchange catalyst according to a conventional method, and then 0.023 part of trimethyl phosphate was added to terminate the ester interchange reaction substantially. Then, 0.024 part of antimony trioxide was added, and polymerization was continued at a high temperature under high vacuum according to a conventional method, to give polyethylene-2,6-naphthalenedicarboxylate (PEN) having an intrinsic viscosity of 0.62 dl/g and a glass transition temperature of 121° C. In addition, the above PEN contained calcium carbonate particles having an average particle diameter of 1.0 μm and kaolin clay particles having an average particle diameter of 0.7 μm as lubricants, when the ester interchange catalyst, such that the contents of these in the PEN polymer were 0.45% by weight and 0.30% by weight, respectively.

The above PEN polymer was dried at 170° C. for 5 hours, then fed to an extruder and melted at a melting temperature of 295° C. The PEN polymer in a molten state was filtered through a non-woven fabric filter which had an average opening of 30 μm and was made of stainless steel fine wires having a wire diameter of 14 μm. Then, the PEN polymer was extruded through a slit die having an aperture of 1 mm, brought into intimate contact with the surface of a rotary drum having a surface finish of 0.3 S with a pinning wire (SUS wire (0.1 mmφ), applied voltage: DC 3 kV) and solidified thereon to obtain an unstretched film.

The above unstretched film was consecutively biaxially stretched in the longitudinal direction (machine direction) and the transverse direction (width direction) (stretched 1.7 times in the longitudinal direction at 135° C. and then twice in the longitudinal direction at 145° C. (total stretch ratio of 3.4 in the longitudinal direction), and then stretched 3.6 times in the transverse direction at 140° C.). Then, the stretched film was thermosetted at 232° C. for 3 seconds and taken up in the form of a roll of a biaxially oriented film having a thickness of 2.0 μm. Table 1 shows physical properties and evaluation results of the biaxially oriented film.

Example 2

A film was formed in the same manner as in Example 1 except that the non-woven fabric filter was replaced with a non-woven fabric filter having an average opening of 35 μm. Table 1 shows physical properties and evaluation results of the biaxially oriented film.

Example 3

A film is formed in the same manner as in Example 1 except that the lubricants were added after the lubricants were filtered through a filter having an average opening of 40μ in the stage of polymerization. Table 1 shows physical properties and evaluation results of the biaxially oriented film.

Examples 4–7

Films were formed in the same manner as in Example 1 except that the kind, the particle diameter and the concentration of the lubricants were changed as shown in Table 1. Table 1 shows physical properties and evaluation results of the biaxially oriented films.

Example 8

A film was formed in the same manner as in Example 1 except that an unstretched film was stretched 3.2 times in the longitudinal direction (machine direction) once at 145° C., that the thus-stretched film was stretched 4 times in the transverse direction and that the thermosetting temperature was changed to 225° C. Table 1 shows physical properties and evaluation results of the biaxially oriented film.

Example 9

A film was formed in the same manner as in Example 1 except that an unstretched film was stretched twice in the longitudinal direction (machine direction) at 135° C. and then stretched 1.9 times in the longitudinal direction (machine direction) at 135° C. (total stretch ratio of 3.8 in the longitudinal direction) and that the thus-stretched film was stretched 4.1 times in the transverse direction. Table 1 shows physical properties and evaluation results of the biaxially oriented film.

Example 10

94 Parts of dimethyl 2,6-naphthalenedicarboxylate, 6 parts of terephthalic acid (to be sometimes abbreviated as TA) and 60 parts of ethylene glycol were used, calcium carbonate particles having an average particle diameter of 1.0 μm as lubricants and kaolin clay particles having an average particle diameter of 0.7 μm as lubricants were added such that the content of the calcium carbonate particles was 0.45% by weight and that the content of the kaolin clay particles was 0.30% by weight, and the mixture was reacted in an ester interchange reaction in the presence of 0.03 part of manganese acetate tetrahydrate as an ester interchange catalyst in the same manner as in Example 1, to give a polyethylene-2,6-naphthalate copolymer (TA-copolymerized PEN) having an intrinsic viscosity of 0.60 dl/g and a Tg of 116° C.

The above TA-copolymerized PEN polymer was dried at 150° C. for 5 hours, then fed to an extruder, melted at 285° C. and processed in the same manner as in Example 1, to obtain an unstretched film. The unstretched film was consecutively biaxially stretched (stretched twice in the longitudinal direction at 130° C., then stretched 1.8 times in the longitudinal direction at 135° C. (total stretch ratio of 3.6 in the longitudinal direction) and stretched 4 times in the transverse direction at 135° C.), and thermosetted at 225° C. for 3 seconds. The film was taken up in the form of a roll of a biaxially oriented film having a thickness of 2.0 μm. Table 1 shows physical properties and evaluation results of the biaxially oriented film.

TABLE 1

|  |  | Ex. 1 | Ex. 2 | Ex. 3 | Ex. 4 | Ex. 5 |
|---|---|---|---|---|---|---|
| Polymer | Main component polymer | PEN | PEN | PEN | PEN | PEN |
|  | Mol % of main component | 100% | 100% | 100% | 100% | 100% |
|  | Comonomer component | — | — | — | — | — |
|  | Mol % of comonomer component | — | — | — | — | — |
|  | Tg | 121 | 121 | 121 | 121 | 121 |
|  | AC volume resistivity ($10^8$ Ω cm) | 19 | 19 | 19 | 19 | 19 |
|  | Lubricant (1), kind | Calcium carbonate | Calcium carbonate | Calcium carbonate | Calcium carbonate | Calcium carbonate |
|  | Average particle diameter (μm) | 1 | 1 | 1 | 1 | 1 |
|  | Concentration (wt %) | 0.45 | 0.45 | 0.45 | 0.7 | 0.15 |
|  | Lubricant (2), kind | Kaolin clay | Kaolin clay | Kaolin clay | Kaolin clay | Kaolin clay |
|  | Average particle diameter (μm) | 0.6 | 0.6 | 0.6 | 0.6 | 0.6 |
|  | Concentration (wt %) | 0.3 | 0.3 | 0.3 | 0.1 | 0.75 |
| Film | Stretch ratio |  |  |  |  |  |
|  | longitudinal direction | 3.4 | 3.4 | 3.4 | 3.4 | 3.4 |
|  | transverse direction | 3.6 | 3.6 | 3.6 | 3.6 | 3.6 |
|  | Thermosetting temperature | 232 | 232 | 232 | 232 | 232 |
|  | Thickness (μm) | 2 | 2 | 2 | 2 | 2 |
|  | Variability of thickness (%) | 15 | 15 | 15 | 15 | 15 |
|  | Flyspecks (>60 μm) Number (/m$^2$) | 4 | 8 | 0 | 2 | 7 |
|  | Coarse particles (>35 μm) Number (/m$^2$) | 0 | 4 | 0 | 0 | 1 |
|  | Surface roughness |  |  |  |  |  |
|  | (Ra) (nm) | 64 | 67 | 62 | 73 | 70 |
|  | (Rz) (nm) | 1400 | 1500 | 1350 | 1650 | 1600 |
|  | Intrinsic viscosity (dl/g) | 0.54 | 0.54 | 0.54 | 0.54 | 0.54 |
|  | Density (g/cm$^3$) | 1.352 | 1.352 | 1.352 | 1.352 | 1.352 |
|  | Heat shrinkage factor (200° C. × 10 min) longitudinal direction % | 2.2 | 2.2 | 2.2 | 2.2 | 2.2 |
|  | Transverse direction % | 4 | 4 | 4 | 4 | 4 |
|  | Heat shrinkage factor ratio (MD/TD) | 0.55 | 0.55 | 0.55 | 0.55 | 0.55 |
|  | Dielectric breakdown voltage (BDV) V/μm | 270 | 230 | 295 | 290 | 235 |
|  | Film formability | ○ | ○ | ○ | ○ | Δ |
|  | Take-up form of film roll | ⊙ | ⊙ | ⊙ | ⊙ | ⊙ |
|  | Total evaluation | ⊙ | ○ | ⊙ | ⊙ | ○ |
| Composite film | Kind of electrically conductive film | Aluminum | Aluminum | Aluminum | Aluminum | Aluminum |
|  | Film thickness (angstrom) | 600 | 600 | 600 | 600 | 600 |
|  | CR value (100° C.) (ΩF) | 1600 | 1600 | 1600 | 1600 | 1600 |
|  | Number of insulation defects (/m$^2$) | 2 | 4 | 0 | 1 | 3 |
| Product | Insulation failure ratio (%) | 0.5 | 0.5 | 0.1 | 0.2 | 1 |

TABLE 1-continued

|  |  | Ex. 6 | Ex. 7 | Ex. 8 | Ex. 9 | Ex. 10 |
|---|---|---|---|---|---|---|
| Polymer | Main component polymer | PEN | PEN | PEN | PEN | PEN |
|  | Mol % of main component | 100% | 100% | 100% | 100% | 92% |
|  | Comonomer component | — | — | — | — | TA |
|  | Mol % of comonomer component | — | — | — | — | 8% |
|  | Tg | 121 | 121 | 121 | 121 | 116 |
|  | AC volume resistivity ($10^8$ Ω cm) | 19 | 19 | 19 | 19 | 19 |
|  | Lubricant (1), kind | Calcium carbonate | Calcium carbonate | Calcium carbonate | Calcium carbonate | Calcium carbonate |
|  | Average particle diameter (μm) | 1 | 1 | 1 | 1 | 1 |
|  | Concentration (wt %) | 0.3 | 0.35 | 0.45 | 0.45 | 0.45 |
|  | Lubricant (2), kind | Kaolin clay | spherical silica | Kaolin clay | Kaolin clay | Kaolin clay |
|  | Average particle diameter (μm) | 1 | 0.1 | 0.7 | 0.7 | 0.7 |
|  | Concentration (wt %) | 0.15 | 0.8 | 0.3 | 0.3 | 0.3 |
| Film | Stretch ratio |  |  |  |  |  |
|  | longitudinal direction | 3.4 | 3.4 | 3.2 | 3.8 | 3.6 |
|  | transverse direction | 3.6 | 3.6 | 4 | 4.1 | 4 |
|  | Thermosetting temperature | 232 | 232 | 225 | 232 | 225 |
|  | Thickness (μm) | 2 | 2 | 2 | 2 | 2 |
|  | Variability of thickness (%) | 15 | 15 | 13 | 11 | 8 |
|  | Flyspecks (>60 μm) Number (/m$^2$) | 6 | 0 | 5 | 7 | 6 |
|  | Coarse particles (>35 μm) Number (/m$^2$) | 3 | 0 | 0 | 0 | 0 |
|  | Surface roughness |  |  |  |  |  |
|  | (Ra) (nm) | 76 | 72 | 63 | 61 | 66 |
|  | (Rz) (nm) | 1650 | 1550 | 1300 | 1250 | 1450 |
|  | Intrinsic viscosity (dl/g) | 0.54 | 0.54 | 0.54 | 0.54 | 0.51 |
|  | Density (g/cm$^3$) | 1.352 | 1.352 | 1.35 | 1.351 | 1.347 |
|  | Heat shrinkage factor (200° C. × 10 min) |  |  |  |  |  |
|  | longitudinal direction % | 2.2 | 2.2 | 2.1 | 2.6 | 2.8 |
|  | Transverse direction % | 4 | 4 | 4.4 | 3.7 | 3.8 |
|  | Heat shrinkage factor ratio (MD/TD) | 0.55 | 0.55 | 0.48 | 0.7 | 0.74 |
|  | Dielectric breakdown voltage (BDV) V/μm | 240 | 290 | 250 | 235 | 230 |
|  | Film formability | ◯ | ◯ | ◯ | ◯ | Δ |
|  | Take-up form of film roll | ◎ | ◎ | ◎ | ◎ | ◎ |
|  | Total evaluation | ◎ | ◎ | ◎ | ◯ | ◯ |
| Composite film | Kind of electrically conductive film | Aluminum | Aluminum | Aluminum | Aluminum | Aluminum |
|  | Film thickness (angstrom) | 600 | 600 | 600 | 600 | 600 |
|  | CR value (100° C.) (ΩF) | 1600 | 1600 | 1600 | 1600 | 1600 |
|  | Number of insulation defects (/m$^2$) | 3 | 0 | 2 | 3 | 2 |
| Product | Insulation failure ratio (%) | 1 | 0.1 | 0.5 | 1 | 1 |

Ex.: Example

Comparative Examples 1–3

Films were formed in the same manner as in Example 2 except that the kind, the particle diameter and the concentration of lubricants were changed as shown in Table 3. Table 2 shows physical properties and evaluation results of the biaxially oriented films.

Comparative Example 4

A film was formed in the same manner as in Example 1 except that the non-woven fabric filter was replaced with a non-woven fabric filter having an average opening of 45μ. Table 2 shows physical properties and evaluation results of the biaxially oriented film.

Comparative Example 5

A film was formed in the same manner as in Example 1 except that an unstretched film was stretched twice in the longitudinal direction at 130° C. and then stretched 1.3 times in the longitudinal direction at 135° C. (stretch ratio of 2.6 in the longitudinal direction), and then thus-stretched film was stretched 2.8 times in the transverse direction. Table 2 shows physical properties and evaluation results of the biaxially oriented film.

Comparative Example 6

A film was formed in the same manner as in Example 1 except that the temperatures at which the stretching in the longitudinal direction and the stretching in the transverse direction were carried out were changed to 115° C. and that the thermosetting temperature was changed to 200° C. Table 2 shows physical properties and evaluation results of the biaxially oriented film.

Comparative Example 7

89 Parts of dimethyl 2,6-naphthalenedicarboxylate, 11 parts of terephthalic acid (to be sometimes abbreviated as TA) and 60 parts of ethylene glycol were used, calcium carbonate particles having an average particle diameter of 1.0 μm as lubricants and kaolin clay particles having an average particle diameter of 0.7 μm as lubricants were added such that the content of the calcium carbonate particles was 0.45% by weight and that the content of the kaolin clay particles was 0.30% by weight, and the mixture was reacted in an ester interchange reaction in the presence of 0.03 part of manganese acetate tetrahydrate as an ester interchange catalyst in the same manner as in Example 1, to give a polyethylene-2,6-naphthalate copolymer (TA-copolymerized PEN) having an intrinsic viscosity of 0.58 dl/g and a Tg of 113° C. This TA-copolymerized PEN polymer was dried at 140° C. for 5 hours, then fed to an extruder, melted at 285° C. and processed in the same manner as in Example 1, to obtain an unstretched film. The unstretched film was consecutively biaxially stretched (stretched 1.8 times in the longitudinal direction (machine direction) at 120° C., then stretched twice in the longitudinal direction at 130° C. (stretch ratio of 3.6 in the longitudinal direction) and stretched 3.8 times in the transverse direction (width direction) at 130° C.), and thermosetted at 220° C. for 3 seconds. The film was taken up in the form of a roll of a biaxially oriented film having a thickness of 2.0 μm. Table 2 shows physical properties and evaluation results of the biaxially oriented film.

temperature-increased up to 290° C. and polymerized condensation under a high vacuum of 30 Pa or lower, to give polyethylene-2,6-naphthalenedicarboxylate (PEN) having an intrinsic viscosity, measured in an o-chlorophenol solution at 25° C., of 0.61 dl/g and a glass transition temperature of 121° C.

The above polymer was dried at 170° C. for 6 hours, fed to an extruder, and melted at a melting temperature of 310° C. The PEN polymer in a molten state was filtered through a non-woven fabric filter which was made of stainless steel fine wires having a wire diameter of 14 μm and had an average opening of 30 μm. Then, the PEN polymer was extruded through a slit die onto a rotary drum having a surface finish of 0.3 S, brought into intimate contact with the drum with a pinning wire (SUS wire (0.1 mmφ), applied voltage: DC 3 kV) and solidified thereon to give an unstretched film.

The above unstretched film was consecutively biaxially stretched in the longitudinal direction and the transverse direction (stretched 3.6 times in the longitudinal direction at 140° C. and stretched 3.9 times in the transverse direction at 140° C.), and the stretched film was thermosetted at 232° C. for 5 seconds and taken up in the form of a roll of a biaxially oriented PEN film having a thickness of 2 μm. Table 3 shows physical properties and evaluation results of the thus-obtained biaxially oriented films. These films had a space factor of 4 to 15% or showed no problem.

TABLE 2

|  |  | C. Ex. 1 | C. Ex. 2 | C. Ex. 3 | C. Ex. 4 | C. Ex. 5 | C. Ex. 6 | C. Ex. 7 |
|---|---|---|---|---|---|---|---|---|
| Polymer | Main component polymer | PEN | PEN | PEN | PEN | PEN | PEN | PEN |
|  | Mol % of main component | 100% | 100% | 100% | 100% | 100% | 100% | 85% |
|  | Comonomer component | — | — | — | — | — | — | TA |
|  | Mol % of comonomer component | — | — | — | — | — | — | 15% |
|  | Tg | 121 | 121 | 121 | 121 | 121 | 121 | 113 |
|  | AC volume resistivity ($10^8$ Ω cm) | 19 | 19 | 19 | 19 | 19 | 19 | 19 |
|  | Lubricant (1), kind | Kaolin clay | Calcium carbonate | spherical silica | Calcium carbonate | Calcium carbonate | Calcium carbonate | Calcium carbonate |
|  | Average particle diameter (μm) | 0.6 | 1 | 0.4 | 1 | 1 | 1 | 1 |
|  | Concentration (wt %) | 0.3 | 0.3 | 0.4 | 0.45 | 0.45 | 0.45 | 0.45 |
|  | Lubricant (2), kind | Kaolin clay | Kaolin clay | — | Kaolin clay | Kaolin clay | Kaolin clay | Kaolin clay |
|  | Average particle diameter (μm) | 0.6 | 2 | — | 0.6 | 0.6 | 0.6 | 0.7 |
|  | Concentration (wt %) | 0.3 | 0.1 | — | 0.3 | 0.3 | 0.3 | 0.3 |
| Film | Stretch ratio |  |  |  |  |  |  |  |
|  | longitudinal direction | 3.4 | 3.4 | 3.4 | 3.4 | 2.6 | 3.4 | 3.4 |
|  | transverse direction | 3.6 | 3.6 | 3.6 | 3.6 | 3.6 | 3.6 | 3.6 |
|  | Thermosetting temperature | 232 | 232 | 232 | 232 | 232 | 200 | 220 |
|  | Thickness (μm) | 2 | 2 | 2 | 2 | 2 | 2 | 2 |
|  | Variability of thickness (%) | 15 | 15 | 15 | 15 | 31 | 10 | 28 |
|  | Flyspecks (>60 μm) Number (/$m^2$) | 31 | 27 | 0 | 34 | 0 | 24 | 6 |
|  | Coarse particles (>35 μm) Number (/$m^2$) | 12 | 2 | 0 | 14 | 0 | 0 | 0 |
|  | Surface roughness |  |  |  |  |  |  |  |
|  | (Ra) (nm) | 70 | 77 | 38 | 71 | 67 | 59 | 65 |
|  | (Rz) (nm) | 1700 | 1850 | 900 | 1600 | 1550 | 1350 | 1500 |
|  | Intrinsic viscosity (dl/g) | 0.54 | 0.54 | 0.54 | 0.54 | 0.54 | 0.54 | 0.49 |
|  | Density (g/$cm^3$) | 1.352 | 1.352 | 1.352 | 1.352 | 1.353 | 1.342 | 1.345 |
|  | Heat shrinkage factor (200° C. × 10 min) longitudinal direction % | 2.2 | 2.2 | 2.2 | 2.2 | 2 | 2.8 | 3.4 |
|  | Transverse direction % | 4 | 4 | 4 | 4 | 2.2 | 4.4 | 3.7 |
|  | Heat shrinkage factor ratio (MD/TD) | 0.55 | 0.55 | 0.55 | 0.55 | 0.91 | 0.64 | 0.92 |
|  | Dielectric breakdown voltage (BDV) V/μm | 150 | 155 | 290 | 150 | 225 | 140 | 230 |
|  | Film formability | Δ | Δ | ○ | ○ | Δ | Δ | Δ |
|  | Take-up form of film roll | ⊚ | ⊚ | × | ⊚ | × | ⊚ | × |
|  | Total evaluation | × | × | × | × | × | × | × |
| Composite film | Kind of electrically conductive film | Aluminum | Aluminum | Aluminum | Aluminum | Aluminum | Aluminum | Aluminum |
|  | Film thickness (angstrom) | 600 | 600 | 600 | 600 | 600 | 600 | 600 |
|  | CR value (100° C.) (ΩF) | 800 | 600 | 700 | 1600 | 1600 | 1000 | 1300 |
|  | Number of insulation defects (/$m^2$) | 26 | 22 | 0 | 28 | 0 | 21 | 4 |
| Product | Insulation failure ratio (%) | 15 | 12 | 0.1 | 17 | 0.1 | 11 | 1 |

C. Ex.: Comparative Example

Examples 11–13

100 Parts of dimethyl 2,6-naphthalenedicarboxylate and 60 parts of ethylene glycol were reacted in an ester interchange reaction in the presence of 0.03 part of manganese acetate tetrahydrate as an ester interchange catalyst while gradually increasing a temperature from 150° C. to 240° C. At a point of time when the temperature reached 170° C., 0.024 part of antimony trioxide was added, and further, calcium carbonate having an average particle diameter of 1.0 μm as lubricants in an amount shown in Table 3 was added as a lubricant. Then, at a point of time when the temperature reached 220° C., 0.042 part (corresponding to 2 mmol %) of 3,5-dicarboxybenzenesulfonic acid tetrabutylphosphonium salt was added, and the ester interchange reaction was continued. After completion of the ester interchange reaction, 0.023 part of trimethyl phosphate was added. Then, a reaction product was transferred to a polymerizer,

Example 14

A film was formed in the same manner as in Example 11 except that the calcium carbonate particles were replaced with calcium carbonate particles having an average particle diameter of 0.8 μm, that the concentration thereof was changed to 0.75% by weight, and that the amount of 3,5-dicarboxybenzenesulfonic acid tetrabutylphosphonium salt was replaced with 2 mmol %. Table 3 shows physical properties and evaluation results of the biaxially oriented film.

Example 15

A film was formed in the same manner as in Example 11 except that the calcium carbonate particles were replaced with calcium carbonate particles having an average particle diameter of 1.2 μm, that the amount thereof was changed to 0.5% by weight and that the dimethyl 2,6-naphthalenedicarboxylate was replaced with a mixture of dimethyl 2,6-naphthalenedicarboxylate and isophthalic acid (IA) in a molar ratio of 95:5. Table 3 shows physical properties and evaluation results of the biaxially oriented film.

Example 16

An unstretched film was formed in the same manner as in Example 1 except that the lubricants were replaced with spherical silica particles having an average particle diameter of 1.3 μm and spherical silica particles having an average particle diameter of 0.2 μm, that the amounts thereof are changed to 0.35% by weight and 0.25% by weight and that an average opening of the non-woven fabric filter was changed to 25 μm. The above unstretched film was consecutively biaxially stretched (stretched 1.4 times in the longitudinal direction at 130° C., also stretched 2.5 times in the longitudinal direction at 135° C. (total stretch ratio of 3.5 in the longitudinal direction) and stretched 4.0 times in the transverse direction at 135° C.), thermosetted at 230° C. for 3 seconds, and the stretched film was taken up in the form of a roll of a biaxially oriented film having a thickness of 2.5 μm. Table 4 shows physical properties and evaluation results of the obtained biaxially oriented film.

Example 17

A film was formed in the same manner as in Example 16 except that a sintered metal filter having an average opening

TABLE 3

| | | Ex. 11 | Ex. 12 | Ex. 13 | Ex. 14 | Ex. 15 |
|---|---|---|---|---|---|---|
| Polymer | Main component polymer | PEN | PEN | PEN | PEN | PEN |
| | Mol % of main component | 100% | 100% | 100% | 100% | 95% |
| | Comonomer component | — | — | — | — | IA |
| | Mol % of comonomer component | — | — | — | — | 5% |
| | Tg | 121 | 121 | 121 | 121 | 118 |
| | Quaternary phosphonium salt | C | C | C | D | C |
| | Amount (mmol %) | 2 | 9 | 0.2 | 2 | 2 |
| | AC volume resistivity ($10^8$ Ω cm) | 2 | 0.7 | 8 | 2.2 | 1.8 |
| | Lubricant (1), kind | Calcium carbonate | Calcium carbonate | Calcium carbonate | Calcium carbonate | Calcium carbonate |
| | Average particle diameter (μm) | 1 | 1 | 1 | 0.8 | 1.2 |
| | Concentration (wt %) | 0.45 | 0.45 | 0.45 | 0.75 | 0.5 |
| | Lubricant (2), kind | Kaolin clay | Kaolin clay | Kaolin clay | Kaolin clay | — |
| | Average particle diameter (μm) | 0.6 | 0.6 | 0.6 | 0.6 | — |
| | Concentration (wt %) | 0.3 | 0.3 | 0.3 | 0.3 | — |
| Film | Stretch ratio | | | | | |
| | longitudinal direction | 3.6 | 3.6 | 3.6 | 3.6 | 3.6 |
| | transverse direction | 3.9 | 3.9 | 3.9 | 3.9 | 3.9 |
| | Thermosetting temperature | 232 | 232 | 232 | 2323 | 232 |
| | Thickness (μm) | 2 | 2 | 2 | 2 | 7 |
| | Variability of thickness (%) | 12 | 12 | 12 | 12 | 15 |
| | Flyspecks (>60 μm) Number (/m²) | 4 | 3 | 4 | 5 | 4 |
| | Coarse particles (>35 μm) Number (/m²) | 0 | 0 | 0 | 0 | 0 |
| | Surface roughness | | | | | |
| | (Ra) (nm) | 64 | 66 | 63 | 58 | 71 |
| | (Rz) (nm) | 1300 | 1250 | 1350 | 1200 | 1450 |
| | Intrinsic viscosity (dl/g) | 0.54 | 0.53 | 0.54 | 0.54 | 0.54 |
| | Density (g/cm³) | 1.352 | 1.353 | 1.352 | 1.352 | 1.349 |
| | Heat shrinkage factor (200° C. × 10 min) | 2.2 | 2.2 | 2.2 | 2.2 | 2.5 |
| | longitudinal direction % | | | | | |
| | Transverse direction % | 4 | 4 | 4 | 4 | 4.2 |
| | Heat shrinkage factor ratio (MD/TD) | 0.550 | 0.550 | 0.550 | 0.550 | 0.595 |
| | Dielectric breakdown voltage (BDV) V/μm | 270 | 265 | 275 | 275 | 250 |
| | Film formability | ⊚ | ⊚ | ⊚ | ⊚ | ⊚ |
| | Take-up form of film roll | ⊚ | ⊚ | ⊚ | ○ | ⊚ |
| | Total evaluation | ⊚ | ⊚ | ⊚ | ⊚ | ⊚ |
| Composite film | Kind of electrically conductive film | Aluminum | Aluminum | Aluminum | Aluminum | Aluminum |
| | Film thickness (angstrom) | 600 | 600 | 600 | 600 | 600 |
| | CR value (100° C.) (ΩF) | 1600 | 900 | 1650 | 1600 | 1400 |
| | Number of insulation defects (/m²) | 2 | 1 | 2 | 2 | 2 |
| Product | Insulation failure ratio (%) | 1 | 0.5 | 1 | 1 | 1 |

Ex.: Example of 20μ was used. Table 4 shows physical properties and evaluation results of the obtained biaxially oriented film.

Example 18 and Comparative Example 8

Films were formed in the same manner as in Example 16 except that the average particle diameter and the concentration of the lubricants were changed as shown in Table 4. Table 4 shows physical properties and evaluation results of the obtained biaxially oriented films.

Example 19

An unstretched film was formed in the same manner as in Example 11 except that the lubricants were replaced with spherical silica particles having an average particle diameter of 1.3 μm and spherical silica particles having an average particle diameter of 0.2 μm, that the amounts thereof are changed to 0.35% by weight and 0.25% by weight and that an average opening of the non-woven fabric filter was changed to 25 μm. The above unstretched film was consecutively biaxially stretched (stretched 1.4 times in the longitudinal direction at 130° C., also stretched 2.5 times in the longitudinal direction at 135° C. (total stretch ratio of 3.5 in Example 20

A film was formed in the same manner as in Example 19 except that the lubricants were replaced with spherical silica particles having an average particle diameter of 0.6 μm and spherical silica particles having an average particle diameter of 0.3 μm, that the amounts thereof are changed to 0.6% by weight and 0.5% by weight and that the amount of the 3,5-dicarboxybenzenesulfonic acid tetrabutylphosphonium salt was changed to 9 mmol %. Table 4 shows physical properties and evaluation results of the obtained biaxially oriented film.

Example 21

A film was formed in the same manner as in Example 19 except that the 3,5-dicarboxybenzenesulfonic acid tetrabutylphosphonium salt was replaced with 3,5-dicarboxybenzenesulfonic acid tetraphenylphosphonium salt. Table 4 shows physical properties and evaluation results of the obtained biaxially oriented film.

TABLE 4

| | | Ex. 16 | Ex. 17 | Ex. 18 | C. Ex. 8 | Ex. 19 | Ex. 20 | Ex. 21 |
|---|---|---|---|---|---|---|---|---|
| Polymer | Main component polymer | PEN | PEN | PEN | PEN | PEN | PEN | PEN |
| | Mol % of main component | 100% | 100% | 100% | 100% | 100% | 100% | 100% |
| | Tg | 121 | 121 | 121 | 121 | 121 | 121 | 121 |
| | Quaternary phosphonium salt | — | — | — | — | C | C | D |
| | Amount (mmol %) | — | — | — | — | 2 | 9 | 2 |
| | AC volume resistivity ($10^8$ Ω cm) | 19 | 19 | 19 | 19 | 2 | 0.8 | 2.2 |
| | Lubricant (1), kind | spherical silica | spherical silica | spherical silica | spherical silica | spherical silica | spherical silica | spherical silica |
| | Average particle diameter (μm) | 1.3 | 1.3 | 2.3 | 0.3 | 1.3 | 0.6 | 1.3 |
| | Concentration (wt %) | 0.35 | 0.35 | 0.2 | 0.6 | 0.35 | 0.6 | 0.35 |
| | Lubricant (2), kind | spherical silica | spherical silica | spherical silica | spherical silica | spherical silica | spherical silica | spherical silica |
| | Average particle diameter (μm) | 0.2 | 0.2 | 0.2 | 0.03 | 0.2 | 0.3 | 0.2 |
| | Concentration (wt %) | 0.25 | 0.25 | 0.25 | 0.8 | 0.25 | 0.5 | 0.25 |
| Film | Stretch ratio | | | | | | | |
| | longitudinal direction | 3.5 | 3.5 | 3.5 | 3.5 | 3.6 | 3.6 | 3.6 |
| | transverse direction | 4 | 4 | 4 | 4 | 3.9 | 3.9 | 3.9 |
| | Thermosetting temperature | 230 | 230 | 230 | 230 | 220 | 220 | 220 |
| | Thickness (μm) | 2.5 | 2.5 | 2.5 | 2.5 | 2.2 | 2.2 | 2.2 |
| | Variability of thickness (%) | 12 | 12 | 12 | 12 | 12 | 12 | 12 |
| | Flyspecks (>60 μm) Number (/m$^2$) | 0 | 0 | 0 | 0 | 0 | 0 | 0 |
| | Coarse particles (>35 μm) Number (/m$^2$) | 0 | 0 | 0 | 0 | 0 | 0 | 0 |
| | Surface roughness | | | | | | | |
| | (Ra) (nm) | 64 | 64 | 64 | 64 | 58 | 42 | 58 |
| | (Rz) (nm) | 1200 | 1150 | 1300 | 750 | 1200 | 1000 | 1200 |
| | Intrinsic viscosity (dl/g) | 0.54 | 0.54 | 0.54 | 0.54 | 0.54 | 0.54 | 0.54 |
| | Density (g/cm$^3$) | 1.35 | 1.35 | 1.35 | 1.35 | 1.35 | 1.35 | 1.35 |
| | Heat shrinkage factor (200° C. × 10 min) longitudinal direction % | 2.1 | 2.1 | 2.1 | 2.1 | 2.4 | 2.4 | 2.4 |
| | Transverse direction % | 4.1 | 4.1 | 4.1 | 4.1 | 4.3 | 4.3 | 4.3 |
| | Heat shrinkage factor ratio (MD/TD) | 0.512 | 0.512 | 0.512 | 0.512 | 0.558 | 0.558 | 0.558 |
| | Dielectric breakdown voltage (BDV) V/μm | 290 | 290 | 250 | 290 | 260 | 270 | 260 |
| | Film formability | ○ | ○ | △ | ○ | ◎ | ◎ | ◎ |
| | Take-up form of film roll | ◎ | ◎ | ◎ | × | ◎ | ○ | ◎ |
| | Total evaluation | ◎ | ◎ | ○ | × | ◎ | ◎ | ◎ |

Ex.: Example
C. Ex.: Comparative Example the longitudinal direction) and stretched 4.0 times in the transverse direction at 135° C.) and the stretched film was thermosetted at 230° C. for 3 seconds and was taken up in the form of a roll of a biaxially oriented film having a thickness of 2.2 μm. Table 4 shows physical properties and evaluation results of the obtained biaxially oriented film.

Example 22

An unstretched film was formed in the same manner as in Example 1 except that the lubricants were replaced with porous silica particles having an average particle diameter of 2.0 μm and spherical silica particles having an average particle diameter of 0.6 μm, that the amounts thereof were changed to 0.35% by weight and 0.25% by weight and that an average opening of the non-woven fabric filter was changed to 28 μm. The above unstretched film was consecutively biaxially stretched (stretched 1.75 times in the longitudinal direction at 135° C., also stretched twice in the longitudinal direction at 145° C. (total stretch ratio of 3.5 in the longitudinal direction) and stretched 3.8 times in the transverse direction at 150° C.) and the stretched film was thermosetted at 235° C. for 3 seconds and taken up in the form of a roll of a biaxially oriented film having a thickness of 2.0 μm. Table 5 shows physical properties and evaluation results of the obtained biaxially oriented film.

Example 23

A film is formed in the same manner as in Example 22 except that the lubricants were added after the lubricants were filtered through a filter having an average opening of 30μ in the stage of polymerization. Table 5 shows physical properties and evaluation results of the biaxially oriented film.

Example 24

A film was formed in the same manner as in Example 22 except that the lubricants were replaced with porous silica particles having an average particle diameter of 1.7 μm and spherical silica particles having an average particle diameter of 0.4 μm and that the amount of each of them was changed to 0.4% by weight. Table 5 shows physical properties and evaluation results of the biaxially oriented film.

Example 25

A film was formed in the same manner as in Example 22 except that the consecutive stretching in the longitudinal direction was changed to once stretching of an unstretched film 3.5 times in the longitudinal direction at 145° C. Table 5 shows physical properties and evaluation results of the biaxially oriented film.

Comparative Example 9

A film was formed in the same manner as in Example 22 except that the lubricants were replaced with porous silica particles having an average particle diameter of 3.5 μm and spherical silica particles having an average particle diameter of 0.6 μm and that the amounts thereof were changed to 0.2% by weight and 0.1% by weight. Table 5 shows physical properties and evaluation results of the biaxially oriented film.

Example 26

An unstretched film was formed in the same manner as in Example 11 except that the lubricants were replaced with porous silica particles having an average particle diameter of 2.0 μm and spherical silica particles having an average particle diameter of 0.6 μm, that the amounts thereof were changed to 0.35% by weight and 0.25% by weight and that an average opening of the non-woven fabric filter was changed to 28 μm. The above unstretched film was consecutively biaxially stretched (stretched 3.6 times in the longitudinal direction at 140° C. and stretched 3.9 times in the transverse direction at 140° C.) and the stretched film was thermosetted at 232° C. for 5 seconds and taken up in the form of a roll of a biaxially oriented film having a thickness of 2.2 μm. Table 5 shows physical properties and evaluation results of the obtained biaxially oriented film.

Example 27

A film was formed in the same manner as in Example 26 except that the amounts of the porous silica particles and the spherical silica particles were changed to 0.4% by weight and 0.2% by weight and that 3,5-dicarboxybenzenesulfonic acid tetrabutylphosphonium salt was replaced with 3,5-dicarboxybenzenesulfonic acid tetraphenylphosphonium salt. Table 5 shows physical properties and evaluation results of the biaxially oriented film.

TABLE 5

|  |  | Ex. 22 | Ex. 23 | Ex. 24 | Ex. 25 | C. Ex. 9 | Ex. 26 | Ex. 27 |
|---|---|---|---|---|---|---|---|---|
| Polymer | Main component polymer | PEN | PEN | PEN | PEN | PEN | PEN | PEN |
|  | Mol % of main component | 100% | 100% | 100% | 100% | 100% | 100% | 95% |
|  | Comonomer component | — | — | — | — | — | — | IA |
|  | Mol % of comonomer component | — | — | — | — | — | — | 5% |
|  | Tg | 121 | 121 | 121 | 121 | 121 | 121 | 118 |
|  | Quaternary phosphonium salt | — | — | — | — | — | C | D |
|  | Amount (mmol %) | — | — | — | — | — | 2 | 2 |
|  | AC volume resistivity ($10^8$ Ω cm) | 19 | 19 | 19 | 19 | 19 | 2 | 2 |
|  | Lubricant (1), kind | Porous silica | Porous silica | Porous silica | Porous silica | Porous silica | Porous silica | Porous silica |
|  | Lubricant pore volume (ml/g) | 1 | 1 | 1.2 | 1 | 0.4 | 1.2 | 1.2 |
|  | Primary particle diameter (μm) | 0.06 | 0.06 | 0.05 | 0.06 | 0.1 | 0.05 | 0.05 |
|  | Average particle diameter (μm) | 2 | 2 | 1.7 | 2 | 3.5 | 2 | 2 |
|  | Concentration (wt %) | 0.35 | 0.35 | 0.4 | 0.35 | 0.2 | 0.35 | 0.4 |
|  | Lubricant (2), kind | spherical silica | spherical silica | spherical silica | spherical silica | spherical silica | spherical silica | spherical silica |
|  | Average particle diameter (μm) | 0.6 | 0.6 | 0.4 | 0.6 | 0.6 | 0.6 | 0.6 |
|  | Concentration (wt %) | 0.25 | 0.25 | 0.4 | 0.25 | 0.1 | 0.25 | 0.2 |
| Film | Stretch ratio |  |  |  |  |  |  |  |
|  | longitudinal direction | 3.5 | 3.5 | 3.5 | 3.5 | 3.5 | 3.6 | 3.6 |
|  | transverse direction | 3.8 | 3.8 | 3.8 | 3.8 | 3.8 | 3.9 | 3.9 |
|  | Thermosetting temperature | 235 | 235 | 235 | 235 | 235 | 230 | 230 |
|  | Thickness (μm) | 2 | 2 | 2 | 2 | 2 | 2.5 | 2.5 |
|  | Variability of thickness (%) | 13 | 13 | 13 | 16 | 13 | 8 | 10 |
|  | Flyspecks (>60 μm) Number (/m²) | 2 | 0 | 0 | 2 | 25 | 2 | 2 |
|  | Coarse particles (>35 μm) Number (/m²) | 3 | 0 | 2 | 3 | 7 | 3 | 3 |

TABLE 5-continued

|  | | Ex. 22 | Ex. 23 | Ex. 24 | Ex. 25 | C. Ex. 9 | Ex. 26 | Ex. 27 |
|---|---|---|---|---|---|---|---|---|
| | Surface roughness | | | | | | | |
| | (Ra) (nm) | 72 | 71 | 69 | 72 | 115 | 72 | 76 |
| | (Rz) (nm) | 1610 | 1590 | 1550 | 1610 | 1800 | 1610 | 1670 |
| | Intrinsic viscosity (dl/g) | 0.54 | 0.54 | 0.54 | 0.54 | 0.51 | 0.54 | 0.54 |
| | Density (g/cm$^3$) | 1.353 | 1.353 | 1.353 | 1.353 | 1.353 | 1.35 | 1.348 |
| | Heat shrinkage factor (200° C. × 10 min) longitudinal direction % | 2 | 2 | 2 | 2.2 | 2 | 2 | 2.3 |
| | Transverse direction % | 3.8 | 3.8 | 3.8 | 3.4 | 3.8 | 3.8 | 4 |
| | Heat shrinkage factor ratio (MD/TD) | 0.526 | 0.526 | 0.526 | 0.647 | 0.526 | 0.526 | 0.575 |
| | Dielectric breakdown voltage (BDV) V/μm | 280 | 300 | 295 | 280 | 220 | 280 | 280 |
| | Film formability | ○ | ○ | ○ | ○ | × | ⊚ | ⊚ |
| | Take-up form of film roll | ⊚ | ⊚ | ⊚ | ⊚ | × | ⊚ | ⊚ |
| | Total evaluation | ⊚ | ⊚ | ⊚ | ⊚ | × | ⊚ | ⊚ |
| Composite film | Kind of electrically conductive film | — | — | — | — | — | Aluminum | Aluminum |
| | Film thickness (angstrom) | — | — | — | — | — | 600 | 600 |
| | CR value (100° C.) (ΩF) | — | — | — | — | — | 2600 | 2400 |
| | Number of insulation defects (/m$^2$) | — | — | — | — | — | 1 | 1 |
| Product | Insulation failure ratio (%) | — | — | — | — | — | 0.2 | 0.2 |

Ex.: Example
C. Ex.: Comparative Example

Example 28

An unstretched film was formed in the same manner as in Example 1 except that the lubricants were replaced with porous silica particles having a pore volume of 1.2 ml/g, a primary particle diameter of 0.05 μm and an average particle diameter of 1.7 μm and that the amount thereof was changed to 0.5% by weight. The above unstretched film was consecutively biaxially stretched (stretched 3.6 times in the longitudinal direction at 140° C. and stretched 3.9 times in the transverse direction at 140° C.) and the stretched film was thermosetted at 232° C. for 5 seconds and taken up in the form of a roll of a biaxially oriented film having a thickness of 2.0 μm. Table 6 shows physical properties and evaluation results of the biaxially oriented film.

Example 29

A film was formed in the same manner as in Example 28 except that the lubricant was replaced with porous silica particles having a pore volume of 1.2 ml/g, a primary particle diameter of 0.02 μm and an average particle diameter of 2.7 μm and that the amount thereof was changed to 0.35% by weight. Table 6 shows physical properties and evaluation results of the biaxially oriented film.

Example 30

A film was formed in the same manner as in Example 28 except that porous silica particles having an average particle diameter of 2.0 μm was used and that the amount thereof was changed to 0.45% by weight. Table 6 shows physical properties and evaluation results of the biaxially oriented film.

Example 31

An unstretched film was formed in the same manner as in Example 11 except that the lubricants were replaced with porous silica particles having a pore volume of 1.2 ml/g, a primary particle diameter of 0.05 μm and an average particle diameter of 1.7 μm and that the amount thereof was changed to 0.5% by weight. The above unstretched film was consecutively biaxially stretched (stretched 3.6 times in the longitudinal direction at 140° C. and stretched 3.9 times in the transverse direction at 140° C.) and the stretched film was thermosetted at 232° C. for 5 seconds and taken up in the form of a roll of a biaxially oriented film having a thickness of 2.0 μm. Table 6 shows physical properties and evaluation results of the biaxially oriented film.

Example 32

A film was formed in the same manner as in Example 31 except that the lubricant was replaced with porous silica particles having a pore volume of 1.2 ml/g, a primary particle diameter of 0.02 μm and an average particle diameter of 2.7 μm, that the amount thereof was changed to 0.35% by weight and that the amount of 3,5-dicarboxybenzenesulfonic acid tetrabutylphosphonium salt was changed to 9 mmol %. Table 6 shows physical properties and evaluation results of the biaxially oriented film.

Example 33

A film was formed in the same manner as in Example 31 except that porous silica particles having an average particle diameter of 2.0 μm was used, that the amount thereof was changed to 0.45% by weight and that the amount of 3,5-dicarboxybenzenesulfonic acid tetrabutylphosphonium salt was changed to 9 mmol %. Table 6 shows physical properties and evaluation results of the biaxially oriented film.

TABLE 6

|  |  | Ex. 28 | Ex. 29 | Ex. 30 | Ex. 31 | Ex. 32 | Ex. 33 |
|---|---|---|---|---|---|---|---|
| Polymer | Main component polymer | PEN | PEN | PEN | PEN | PEN | PEN |
|  | Mol % of main component | 100% | 100% | 100% | 100% | 100% | 100% |
|  | Tg | 121 | 121 | 121 | 121 | 121 | 121 |
|  | Quaternary phosphonium salt | — | — | — | C | C | C |
|  | Amount (mmol %) | — | — | — | 2 | 9 | 0.2 |
|  | AC volume resistivity ($10^8$ Ωcm) | 19 | 19 | 19 | 2 | 0.7 | 8 |
|  | Lubricant (1), kind | Porous silica | Porous silica | Porous silica | Porous silica | Porous silica | Porous silica |
|  | Lubricant pore volume (ml/g) | 1.2 | 1.2 | 1.2 | 1.2 | 1.2 | 1.2 |
|  | Primary particle diameter (μm) | 0.05 | 0.02 | 0.05 | 0.05 | 0.02 | 0.05 |
|  | Average particle diameter (μm) | 1.7 | 2.7 | 2 | 1.7 | 2.7 | 2 |
|  | Concentration (wt %) | 0.5 | 0.35 | 0.45 | 0.5 | 0.35 | 0.45 |
| Film | Stretch ratio |  |  |  |  |  |  |
|  | longitudinal direction | 3.6 | 3.6 | 3.6 | 3.6 | 3.6 | 3.6 |
|  | transverse direction | 3.9 | 3.9 | 3.9 | 3.9 | 3.9 | 3.9 |
|  | Thermosetting temperature | 232 | 232 | 232 | 232 | 232 | 232 |
|  | Thickness (μm) | 2 | 2 | 2 | 2 | 2 | 2 |
|  | Variability of thickness (%) | 13 | 13 | 13 | 13 | 13 | 13 |
|  | Flyspecks (>60 μm) Number (/m²) | 0 | 2 | 0 | 0 | 2 | 0 |
|  | Coarse particles (>35 μm) Number (/m²) | 3 | 7 | 5 | 3 | 7 | 5 |
|  | Surface roughness |  |  |  |  |  |  |
|  | (Ra) (nm) | 67 | 74 | 69 | 67 | 74 | 69 |
|  | (Rz) (nm) | 1400 | 1600 | 1450 | 1400 | 1600 | 1450 |
|  | Intrinsic viscosity (dl/g) | 0.54 | 0.54 | 0.54 | 0.54 | 0.54 | 0.54 |
|  | Density (g/cm³) | 1.352 | 1.352 | 1.352 | 1.352 | 1.353 | 1.352 |
|  | Heat shrinkage factor (200° C. × 10 min) | 2 | 1.9 | 2.1 | 2 | 1.9 | 2.1 |
|  | longitudinal direction % | 3.8 | 3.7 | 3.9 | 3.8 | 3.7 | 3.9 |
|  | Transverse direction % | 0.526 | 0.510 | 0.540 | 0.526 | 0.514 | 0.538 |
|  | Heat shrinkage factor ratio (MD/TD) |  |  |  |  |  |  |
|  | Dielectric breakdown voltage (BDV) V/μm | 270 | 270 | 270 | 260 | 250 | 265 |
|  | Film formability | ○ | ○ | ○ | ⊚ | ⊚ | ⊚ |
|  | Take-up form of film roll | ⊚ | ⊚ | ○ | ⊚ | ⊚ | ⊚ |
|  | Total evaluation | ⊚ | ⊚ | ○ | ⊚ | ⊚ | ⊚ |
| Composite film | Kind of electrically conductive film | Aluminum | — | — | Aluminum | Aluminum | Aluminum |
|  | Film thickness (angstrom) | 600 | — | — | 600 | 600 | 600 |
|  | CR value (100° C.) (ΩF) | 1400 | — | — | 1500 | 900 | 1600 |
|  | Number of insulation defects (/m²) | 0 | — | — | 0 | 2 | 0 |
| Product | Insulation failure ratio (%) | 0.1 | — | — | 0.1 | 0.2 | 0.1 |

Ex.: Example

Example 34

An unstretched film was formed in the same manner as in Example 1 except that the lubricants were replaced with porous silica particles having a pore volume of 1.2 ml/g, a primary particle diameter of 0.05 μm and an average particle diameter of 0.6 μm and porous silica particles having a pore volume of 1.2 ml/g, a primary particle diameter of 0.05 μm and an average particle diameter of 2.0 μm and that the amounts thereof were changed to 0.25% by weight and 0.35% by weight. The above unstretched film was consecutively biaxially stretched (stretched 3.6 times in the longitudinal direction at 140° C. and stretched 3.9 times in the transverse direction at 140° C.) and the stretched film was thermosetted at 235° C. for 5 seconds and taken up in the form of a roll of a biaxially oriented film having a thickness of 2.0 μm. Table 7 shows physical properties and evaluation results of the biaxially oriented film.

Example 35

A film was formed in the same manner as in Example 34 except that the lubricants were replaced with porous silica particles having a pore volume of 1.1 ml/g, a primary particle diameter of 0.06 μm and an average particle diameter of 0.3 μm and porous silica particles having a pore volume of 1.8 ml/g, a primary particle diameter of 0.02 μm and an average particle diameter of 2.7 μm and that the amounts thereof were changed to 0.30% by weight and 0.30% by weight. Table 7 shows physical properties and evaluation results of the biaxially oriented film.

Example 36

A film was formed in the same manner as in Example 34 except that the lubricants were replaced with porous silica particles having a pore volume of 1.2 ml/g, a primary particle diameter of 0.05 μm and an average particle diameter of 0.4 μm and porous silica particles having a pore volume of 0.9 ml/g, a primary particle diameter of 0.05 μm and an average particle diameter of 1.7 μm and that the amounts thereof were changed to 0.40% by weight and 0.40% by weight. Table 7 shows physical properties and evaluation results of the biaxially oriented film.

Example 37

An unstretched film was formed in the same manner as in Example 11 except that the lubricants were replaced with porous silica particles having a pore volume of 1.2 ml/g, a primary particle diameter of 0.05 μm and an average particle diameter of 0.6 μm and porous silica particles having a pore volume of 1.2 ml/g, a primary particle diameter of 0.05 μm and an average particle diameter of 2.0 μm and that the amounts thereof were changed to 0.25% by weight and 0.35% by weight. The above unstretched film was consecutively biaxially stretched (stretched 3.6 times in the longitudinal direction at 140° C. and stretched 3.9 times in the transverse direction at 140° C.) and the stretched film was thermosetted at 232° C. for 5 seconds and taken up in the form of a roll of a biaxially oriented film having a thickness of 2.0 μm. Table 7 shows physical properties and evaluation results of the biaxially oriented film.

Example 38

A film was formed in the same manner as in Example 37 except that the lubricants were replaced with porous silica particles having a pore volume of 1.1 ml/g, a primary particle diameter of 0.06 μm and an average particle diameter of 0.3 μm and porous silica particles having a pore volume of 1.8 ml/g, a primary particle diameter of 0.02 μm and an average particle diameter of 2.7 μm, that the amounts thereof were changed to 0.30% by weight and 0.30% by weight and that the amount of 3,5-dicarboxybenzenesulfonic acid tetrabutylphosphonium salt was changed to 9 mmol %. Table 7 shows physical properties and evaluation results of the biaxially oriented film.

Example 39

A film was formed in the same manner as in Example 37 except that the lubricants were replaced with porous silica particles having a pore volume of 1.2 ml/g, a primary particle diameter of 0.05 μm and an average particle diameter of 0.4 μm and porous silica particles having a pore volume of 0.9 ml/g, a primary particle diameter of 0.05 μm and an average particle diameter of 1.7 μm, that the amounts thereof were changed to 0.40% by weight and 0.40% by weight and that the amount of 3,5-dicarboxybenzenesulfonic acid tetrabutylphosphonium salt was changed to 9 mmol %. Table 7 shows physical properties and evaluation results of the biaxially oriented film.

TABLE 7

|  |  | Ex. 34 | Ex. 35 | Ex. 36 | Ex. 37 | Ex. 38 | Ex. 39 |
|---|---|---|---|---|---|---|---|
| Polymer | Main component polymer | PEN | PEN | PEN | PEN | PEN | PEN |
|  | Mol % of main component | 100% | 100% | 100% | 100% | 100% | 100% |
|  | Tg | 121 | 121 | 121 | 121 | 121 | 121 |
|  | Quaternary phosphonium salt | — | — | — | C | C | C |
|  | Amount (mmol %) | — | — | — | 2 | 9 | 0.2 |
|  | AC volume resistivity ($10^8$ Ωcm) | 19 | 19 | 19 | 2 | 0.7 | 8 |
|  | Lubricant (1), kind | Porous silica | Porous silica | Porous silica | Porous silica | Porous silica | Porous silica |
|  | Lubricant pore volume (ml/g) | 1.2 | 1.1 | 1.2 | 1.2 | 1.1 | 1.2 |
|  | Primary particle diameter (μm) | 0.05 | 0.06 | 0.05 | 0.05 | 0.06 | 0.05 |
|  | Average particle diameter (μm) | 0.6 | 0.3 | 0.4 | 0.6 | 0.3 | 0.4 |
|  | Concentration (wt %) | 0.25 | 0.3 | 0.4 | 0.25 | 0.3 | 0.4 |
|  | Lubricant (2), kind | Porous silica | Porous silica | Porous silica | Porous silica | Porous silica | Porous silica |
|  | Lubricant pore volume (ml/g) | 1.2 | 1.8 | 0.9 | 1.2 | 1.8 | 0.9 |
|  | Primary particle diameter (μm) | 0.05 | 0.02 | 0.05 | 0.05 | 0.02 | 0.05 |
|  | Average particle diameter (μm) | 2 | 2.7 | 1.7 | 2 | 2.7 | 1.7 |
|  | Concentration (wt %) | 0.35 | 0.3 | 0.4 | 0.35 | 0.3 | 0.4 |
| Film | Stretch ratio |  |  |  |  |  |  |
|  | longitudinal direction | 3.6 | 3.6 | 3.6 | 3.6 | 3.6 | 3.6 |
|  | transverse direction | 3.9 | 3.9 | 3.9 | 3.9 | 3.9 | 3.9 |
|  | Thermosetting temperature | 235 | 235 | 235 | 235 | 235 | 235 |
|  | Thickness (μm) | 2 | 2 | 2 | 2 | 2 | 2 |
|  | Variability of thickness (%) | 15 | 15 | 15 | 13 | 12 | 14 |
|  | Flyspecks (>60 μm) Number (/m$^2$) | 0 | 2 | 0 | 0 | 2 | 0 |
|  | Coarse particles (>35 μm) Number (/m$^2$) | 5 | 7 | 3 | 5 | 7 | 3 |
|  | Surface roughness |  |  |  |  |  |  |
|  | (Ra) (nm) | 70 | 82 | 68 | 70 | 82 | 68 |
|  | (Rz) (nm) | 1590 | 1710 | 1550 | 1590 | 1710 | 1550 |
|  | Intrinsic viscosity (dl/g) | 0.54 | 0.54 | 0.54 | 0.54 | 0.54 | 0.54 |
|  | Density (g/cm$^3$) | 1.352 | 1.352 | 1.352 | 1.352 | 1.353 | 1.352 |
|  | Heat shrinkage factor (200° C. × 10 min) | 2 | 2 | 2 | 2 | 2 | 2.1 |
|  | longitudinal direction % | 3.8 | 3.8 | 3.8 | 3.8 | 3.8 | 3.8 |
|  | Transverse direction % | 0.526 | 0.526 | 0.526 | 0.526 | 0.526 | 0.553 |
|  | Heat shrinkage factor ratio (MD/TD) |  |  |  |  |  |  |
|  | Dielectric breakdown voltage (BDV) V/μm | 280 | 280 | 280 | 280 | 220 | 295 |
|  | Film formability | ○ | ○ | ○ | ⊚ | ⊚ | ⊚ |
|  | Take-up form of film roll | ⊚ | ⊚ | ○ | ⊚ | ⊚ | ⊚ |
|  | Total evaluation | ⊚ | ⊚ | ○ | ⊚ | ⊚ | ⊚ |
| Composite film | Kind of electrically conductive film | Aluminum | — | — | Aluminum | Aluminum | Aluminum |
|  | Film thickness (angstrom) | 600 | — | — | 600 | 600 | 600 |
|  | CR value (100° C.) (ΩF) | 1600 | — | — | 1500 | 850 | 1550 |
|  | Number of insulation defects (/m$^2$) | 0 | — | — | 0 | 2 | 0 |
| Product | Insulation failure ratio (%) | 0.1 | — | — | 0.1 | 0.2 | 0.1 |

Ex.: Example

What is claimed is:

1. A composite film for a film condenser, which comprises a biaxially oriented film made of polyethylene-2,6-naphthalenedicarboxylate as a main polymer component and an electrically conductive metal thin layer formed on the surface of the biaxially oriented film, wherein the number of flyspecks having an average diameter of 60 μm or greater in the surface of said biaxially oriented film is 20/m² or less and the number of portions failing to satisfy a dielectric breakdown voltage of 200 V/μm (electrical insulation defects) in said composite film is 20/m² or less.

2. The composite film of claim 1, which has a CR value of at least 800 ΩF.

3. The composite film of claim 1, wherein the electrically conductive metal thin layer is an aluminum metal thin layer.

4. The composite film of claim 1, wherein the electrically conductive metal thin layer has a thickness of 0.01 to 0.1 μm.

5. The composite film of claim 1, wherein the biaxially oriented film has a thickness of 0.5 to 7 μm.

6. The composite film of claim 1, wherein the biaxially oriented film has a central line average roughness (Ra) of 40 to 80 nm in the surface.

7. The composite film of claim 1, wherein the biaxially oriented film contains coarse particles and the number of the coarse particles having a particle diameter of over 35 μm is 10/m² or less.

8. The composite film of claim 1, wherein, after the biaxially oriented film is heat-treated at 200° C. for 10 minutes, the biaxially oriented film has a thermal shrinkage factor in the longitudinal direction (MD) and a thermal shrinkage factor in the transverse direction (TD) in a thermal shrinkage factor ratio (MD/TD) of 0.39 to 0.82.

9. The composite film of claim 1, wherein the biaxially oriented film has a thickness variability of 25% or less.

10. The composite film of claim 1, wherein the biaxially oriented film has a surface in which the number of flyspecks having an average diameter of 60 μm or greater is 15/m² or less.

11. The composite film of claim 1, wherein the biaxially oriented film has a density of 1.338 to 1.361 g/cm³.

12. The composite film of claim 1, wherein the biaxially oriented film is formed of a polyester having an intrinsic viscosity of 0.40 to 0.90 dl/g.

13. A film condenser composed of a laminated composite material formed of a plurality of composite films each of which comprises a biaxially oriented film made of polyethylene-2,6-naphthalenedicarboxylate as a main polymer component and an electrically conductive metal thin layer formed on the surface of the biaxially oriented film, wherein the number of flyspecks having an average diameter of 60 μm or greater in the surface of said biaxially oriented film is 20/m² or less and the percentage of a failure to satisfy a dielectric breakdown voltage of 200 V/μm in the film condenser is 10% or less.

14. A method for producing a film condenser member, which comprises depositing an electrically conductive metal on the surface of a biaxially oriented film made of polyethylene-2,6-naphthalenedicarboxylate as a main polymer component to obtain a composite film having an electrically conductive metal thin layer on the surface thereof and laminating a plurality of such composite films, wherein, as said biaxially oriented film, a film satisfying the following requirements (1) to (3) is used, (1) the biaxially oriented film has a central line average surface roughness (Ra), in the surface thereof, of 40 to 80 nm, (2) the number of flyspecks having an average diameter of 60 μm or greater in the surface thereof is 20/m² or less, and (3) after the biaxially oriented film is heat-treated at 200° C. for 10 minutes, the biaxially oriented film has a thermal shrinkage factor in the longitudinal direction (MD) and a thermal shrinkage factor in the transverse direction (TD) in a thermal shrinkage factor ratio (MD/TD) of 0.39 to 0.82.

15. A polyester film for a condenser, which is a biaxially oriented film made of polyethylene-2,6-naphthalenedicarboxylate as a main polymer component, the film satisfying the following requirements (1) to (3), (1) the biaxially oriented film has a central line average surface roughness (Ra), in the surface thereof, of 40 to 80 nm, (2) the number of flyspecks having an average diameter of 60 μm or greater in the surface thereof is 20/m² or less, and (3) after the biaxially oriented film is heat-treated at 200° C. for 10 minutes, the biaxially oriented film has a thermal shrinkage factor in the longitudinal direction (MD) and a thermal shrinkage factor in the transverse direction (TD) in a thermal shrinkage factor ratio (MD/TD) of 0.39 to 0.82.

16. The polyester film of claim 15, wherein the biaxially oriented film has a thickness variability of 25% or less.

17. The polyester film of claim 15, wherein the biaxially oriented film has a thickness of 0.5 to 7 μm.

18. The polyester film of claim 15, wherein the biaxially oriented film has a central line average surface roughness (Ra), in the surface thereof, of 45 to 80 μm.

19. The polyester film of claim 15, wherein the biaxially oriented film has a surface in which the number of flyspecks having an average diameter of 60 μm or greater is 15/m² or less.

20. The polyester film of claim 15, wherein the thermal shrinkage factor ratio (MD/TD) is 0.41 to 0.80.

21. The polyester film of claim 15, wherein the number of coarse particles having a particle diameter of over 35 μm is 10/m² or less.

22. The polyester film of claim 15, wherein the biaxially oriented film has a density of 1.338 to 1.361 g/cm³.

23. The polyester film of claim 15, wherein the biaxially oriented film is formed of a polyester having an intrinsic viscosity of 0.40 to 0.90 dl/g.

24. The polyester film of claim 15, wherein the biaxially oriented film is formed of a polyester containing 0.03 to 1.5% by weight of spherical silica particles (A) having an average particle diameter of 0.5 to 3.0 μm and 0.05 to 2% by weight of spherical silica particles (B) having an average particle diameter of 0.01 to 1.5 μm.

25. The polyester film of claim 15, wherein the biaxially oriented film is formed of a polyester containing 0.05 to 2% by weight of porous silica particles (A) having an average particle diameter of 0.5 to 5 μm and 0.01 to 1% by weight of spherical silica particles (B) having an average particle diameter of 0.05 to 1.5 μm.

26. The polyester film of claim 25, wherein the porous silica particles (A) have a pore volume of 0.5 to 2.0 ml/g.

27. The polyester film of claim 15, wherein the biaxially oriented film is formed of a polyester containing 0.03 to 2% by weight of calcium carbonate particles (A) having an average particle diameter of 0.2 to 5 μm and 0.03 to 1% by weight of aluminum silicate particles (B) having an average particle diameter of 0.01 to 2 μm.

28. The polyester film of claim 15, wherein the biaxially oriented film is formed of a polyester containing 0.01 to 2.0% by weight of porous silica particles (A) having an average particle diameter of 0.1 to 1.5 μm and 0.01 to 2.0% by weight of porous silica particles (B) having an average particle diameter of 0.7 to 5.0 μm, the average particle diameter of the particles (B) being greater than the average particle diameter of the particles (A) by 0.1 μm or more, the particles (A) and the particles (B) being contained in a total amount of 0.1 to 2.0% by weight.

29. The polyester film of claim 28, wherein the porous silica particles (A) and (B) each have a pore volume of 0.5 to 2.0 ml/g.

* * * * *